US008908078B2

(12) United States Patent  
Takanezawa et al.

(10) Patent No.: US 8,908,078 B2  
(45) Date of Patent: Dec. 9, 2014

(54) NETWORK CAMERA SYSTEM AND CONTROL METHOD THEREFOR IN WHICH, WHEN A PHOTO-TAKING CONDITION CHANGES, A USER CAN READILY RECOGNIZE AN AREA WHERE THE CONDITION CHANGE IS OCCURRING

(75) Inventors: Tetsuhiro Takanezawa, Yokohama (JP); Hiroyuki Ohsawa, Chiba (JP); Hiroshi Sato, Kawasaki (JP); Masakazu Matsugu, Yokohama (JP); Masami Kato, Sagamihara (JP); Katsuhiko Mori, Kawasaki (JP); Yusuke Mitarai, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/082,151

(22) Filed: Apr. 7, 2011

(65) Prior Publication Data

US 2011/0181719 A1    Jul. 28, 2011

Related U.S. Application Data

(63) Continuation of application No. 11/417,578, filed on May 4, 2006, now Pat. No. 7,945,938.

(30) Foreign Application Priority Data

May 11, 2005  (JP) ................................. 2005-138367  
Sep. 5, 2005   (JP) ................................. 2005-256862

(51) Int. Cl.
*H04N 5/222*     (2006.01)  
*G08B 13/196*   (2006.01)  
*H04N 7/18*       (2006.01)  
*H04N 5/232*     (2006.01)  
*H04N 5/262*     (2006.01)

(52) U.S. Cl.  
CPC .............. *H04N 5/232* (2013.01); *G08B 13/196* (2013.01); *H04N 7/183* (2013.01); *H04N 5/23238* (2013.01); *H04N 5/2624* (2013.01); *H04N 5/23206* (2013.01)  
USPC ...................... 348/333.04; 348/152; 348/211.8

(58) Field of Classification Search  
USPC ................ 348/14.03, 47, 143–161, 169–172, 348/207.99, 207.1, 207.11, 208.15, 211.12, 348/231.5, 333.01, 333.02, 335, 211.8; 340/3.1, 3.7, 3.71, 6.1, 8.1, 573.1, 340/691.1–691.6, 815.78; 725/37, 38, 59, 725/105, 131; 715/716, 719–722; 345/650, 345/661; 382/103, 190; 250/342; 244/3.16; 704/271; 463/7; 455/457; 702/150; 341/67  
See application file for complete search history.

(56) References Cited

U.S. PATENT DOCUMENTS 6,888,565 B1 *   5/2005   Tanaka et al. ............ 348/207.11  
7,298,409 B1 *   11/2007  Misawa .................... 348/333.01  
(Continued)

FOREIGN PATENT DOCUMENTS

JP          08124078 A  *  5/1996 ............. G08C 15/00  
WO  WO 2004111973 A1 *  12/2004 ............... G08G 1/13

*Primary Examiner* — Dennis Hogue  
(74) *Attorney, Agent, or Firm* — Canon U.S.A., Inc. IP Division

(57) ABSTRACT

A network camera system is provided that detects an occurrence of a condition change at a periphery of an image pickup apparatus, obtains a direction of the detected condition change, and notifies a user of the occurrence of the condition change and a direction of the condition change on a display of a terminal device.

7 Claims, 28 Drawing Sheets

(56) References Cited

U.S. PATENT DOCUMENTS

| | | | |
|---|---|---|---|
| 2002/0054211 A1* | 5/2002 | Edelson et al. | 348/169 |
| 2002/0159637 A1* | 10/2002 | Echigo et al. | 382/190 |
| 2004/0169587 A1* | 9/2004 | Washington | 340/573.1 |
| 2005/0007453 A1* | 1/2005 | Ahiska | 348/143 |
| 2005/0007478 A1* | 1/2005 | Ahiska | 348/335 |
| 2005/0157173 A1* | 7/2005 | Kurebayashi et al. | 348/207.11 |
| 2012/0176500 A1* | 7/2012 | Muto et al. | 348/148 |

* cited by examiner

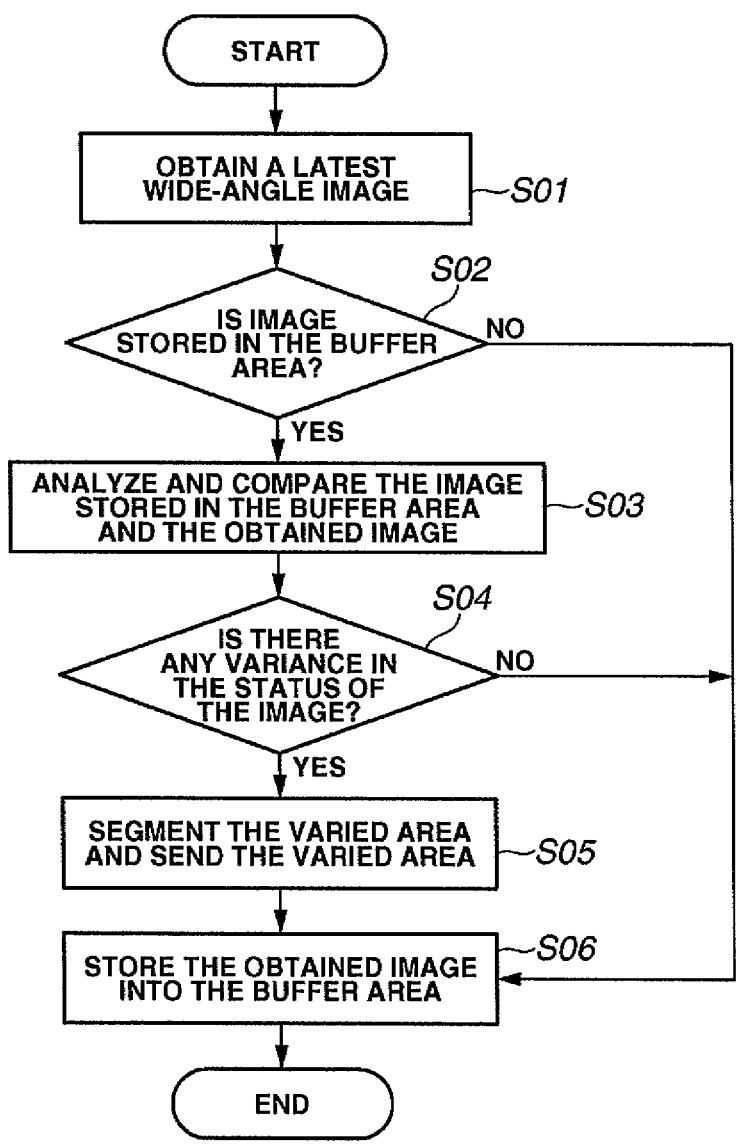

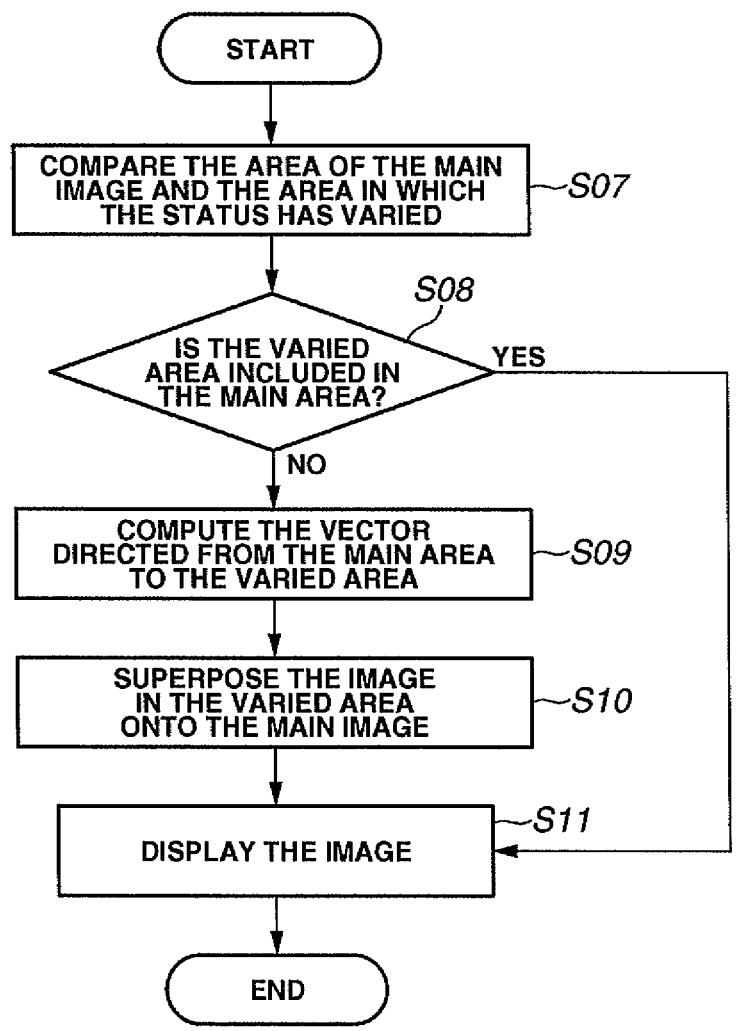

1400

NETWORK CAMERA SYSTEM AND CONTROL METHOD THEREFOR IN WHICH, WHEN A PHOTO-TAKING CONDITION CHANGES, A USER CAN READILY RECOGNIZE AN AREA WHERE THE CONDITION CHANGE IS OCCURRING

CROSS REFERENCE TO RELATED APPLICATIONS

This application is a Continuation of U.S. patent application Ser. No. 11/417,578, filed May 4, 2006, entitled "NETWORK CAMERA SYSTEM AND CONTROL METHOD THEREFORE", the content of which is expressly incorporated by reference herein in its entirety. This application also claims priority from Japanese Patent Application Nos. 2005-138367, filed May 11, 2005 and No. 2005-256862 filed Sep. 5, 2005, which are hereby incorporated by reference herein in their entirety.

BACKGROUND OF THE INVENTION

1. Field of the Invention

The present invention relates to a camera system including a camera, and in particular, relates to a network camera system that displays an image photographed by a camera using a terminal device connected via a network.

2. Description of the Related Art

Conventionally, there is a network camera system that displays an image photographed by a camera using a terminal device connected via a network. In addition, there is a network camera system that displays the image on the terminal device while controlling an image taking direction of the camera through the terminal device. There is, for example, the WebView Livescope system developed by Canon, Inc. The system of this kind is utilized in a monitoring camera and a video conference system.

In a conventional monitoring system, a method is employed in which the image taking direction is previously set and the camera is automatically adjusted in the previously-set direction when a sensor reacts to the object.

In addition, in a system such as the video conference system, a method is employed in which a microphone determines a direction in which a voice comes. The image taking direction of the camera is automatically adjusted to the direction in which the voice comes (refer to Japanese Patent Application Laid-Open No. 07-284186).

However, in the conventional network camera system, when a condition of image taking changes in an area other than areas that are currently being displayed on the terminal device, a user of the camera cannot readily recognize where the condition change occurs.

In addition, if the image taking direction of the camera is automatically adjusted or changed by the sensor or the voice as described above while the user is adjusting and changing the image taking direction of the camera through the terminal device, an interference occurs and the user cannot perform proper operation.

SUMMARY OF THE INVENTION

The present invention is directed to providing a system in which, when a photo-taking condition changes, a user can readily recognize an area where the condition change is occurring.

According to at least one exemplary embodiment of the present invention, a network camera system is provided which is configured to display an image picked up by an image pickup apparatus on a terminal device via a network. The system includes a detection unit configured to detect an occurrence of a condition change at a periphery of the image pickup apparatus; an obtaining unit configured to obtain a direction of the condition change that is detected by the detection unit; and a notification unit configured to notify an occurrence of the condition change and the direction of the condition change on a display of the terminal device.

According to an aspect of the present embodiment, the terminal device displays a predetermined icon or an image in a superposed manner so as to show the direction of the condition change. According to another aspect of the present embodiment, the terminal device displays the icon or the image in a superposed manner in a direction of the condition change relative to a center of a video display area of the terminal device. According to another aspect of the present invention, the terminal device displays scroll bars that represent an operational range and a current value with respect to panning and tilting of the image pickup apparatus and the icon or the image at a position corresponding to a condition change area on the scroll bars.

According to yet another aspect of the present embodiment, the icon has a shape that can specify the direction of the condition change. According to still another aspect of the present invention, wherein the icon or the image corresponds to a kind of the condition change. Moreover, according to another aspect of the present invention, a plurality of the icons or the images may be displayed in a superposed manner in a number of the condition changes.

According to yet another aspect of the present embodiment, the icon or the image is not displayed in the superposed manner if an image of the condition change area is included in a video display area of the terminal device. Furthermore, in another aspect of the present invention, while displaying the icon or the image in the superposed manner, a size of the icon or the image can be changed. Additionally, in another aspect of the present embodiment, the image pickup apparatus displays an image picked up after changing a shooting direction on the terminal device via the network, and the obtaining unit obtains the direction of the condition change relative to the shooting direction.

According to yet another aspect of the present embodiment, the detection unit comprises at least one of an optical sensor, a voice sensor, and a temperature sensor or a combination thereof. And moreover, according to another aspect of the present invention, the image of the condition change area is cut off from an image of all areas previously picked up and stored that can be photographed by the image pickup apparatus. And, according to another aspect of the present invention, the terminal device may be configured to control the image pickup apparatus via the network and change the shooting direction of the image pickup apparatus to the direction of the condition change by selecting the icon or the image.

According to yet another aspect of the present embodiment, the image pickup apparatus cuts off an arbitrary area of the photographed image and displays the cut off area on the terminal device via the network, wherein the obtaining unit obtains the direction of the condition change relative to the cut off area. According to yet another aspect of the present invention, the detection unit includes one of an optical sensor, a voice sensor, a temperature sensor, or an image analysis unit or a combination thereof.

And, according to yet another aspect of the present embodiment, the image is the cut off image of the condition change area. Moreover, according to another aspect of the present invention, the image displayed on the terminal device can be changed to the cut off an image of the area that includes the condition change area by selecting the icon or the image.

According to at least one exemplary embodiment of the present invention, a method is provided for controlling a network camera system configured to display an image picked up by an image pickup apparatus on a terminal device via a network. The method includes detecting an occurrence of a condition change at a periphery of the image pickup apparatus; obtaining a direction of the condition change that is detected by the detection unit; and notifying an occurrence of the condition change and the direction of the condition change on a display of the terminal device.

According to yet another exemplary embodiment of the present invention, an image pickup apparatus is provided which is adapted to send a photographed image to a terminal device via a network. The apparatus includes a detection unit configured to detect an occurrence of a condition change at a periphery of the image pickup apparatus; an obtaining unit configured to obtain a direction of the condition change that is detected by the detection unit or information for obtaining the direction of the condition change; and a transmission unit configured to transmit to the terminal device an occurrence of the condition change and the direction of the condition change or the information for obtaining the direction of the condition change.

According to still another exemplary embodiment of the present invention, a terminal device is provided which is adapted to receive and display an image picked up by an image pickup apparatus via a network. The device includes an obtaining unit configured to obtain a direction of a condition change at a periphery of the image pickup apparatus; and a notification unit configured to notify an occurrence of the condition change and the direction of the condition change on a display of the terminal device.

According to still another exemplary embodiment of the present invention, a computer readable medium is provided which contains computer-executable instructions, the medium utilizable in an image pickup apparatus adapted to transmit a photographed image to a terminal device via a network, the medium configured to cause the terminal device to perform processing. The medium includes computer-executable instructions for detecting an occurrence of a condition change at a periphery of the image pickup apparatus; computer-executable instructions for obtaining a direction of the condition change that is detected or information for obtaining the direction of the condition change; and computer-executable instructions for transmitting to the terminal device an occurrence of the condition change and the direction of the condition change or the information for obtaining the direction of the condition change.

Additionally, according to still another exemplary embodiment of the present embodiment, a computer readable medium is provided which contains computer-executable instructions, the medium utilizable in a terminal device configured to receive and display an image picked up by an image pickup apparatus via a network. The medium includes computer-executable instructions for obtaining a direction of a condition change at a periphery of the image pickup apparatus; and computer-executable instructions for notifying an occurrence of the condition change and the direction of the condition change on a display of the terminal device.

Moreover, according to another exemplary embodiment of the present invention, an image taking apparatus is provided which includes an image taking unit configured to take an image and output an image signal of the image; a sensor unit configured to detect information about an area wider than an image angle of the image taking unit; an extraction unit configured to extract a subject candidate at least out of the information obtained by the sensor unit; and a determination unit configured to determine whether the extracted subject candidate is in or out of an image taking area of the image taking unit based on the information from the sensor unit and an image angle of the image taking unit.

According to yet another aspect of the present embodiment, the extraction unit extracts the subject candidate by further using the image signal output from the image taking unit. In another aspect, the image taking apparatus may further include a notification unit configured to notify a result determined by the determination unit.

According to still another aspect of the present embodiment, the image taking apparatus may further include a moving member detecting unit configured to detect whether the subject candidate is a moving member, and if it is determined that the subject candidate is a moving member, output movement anticipation information; wherein the notification unit further notifies the movement anticipation information; wherein the movement anticipation information includes at least one of information about a movement speed and direction of the subject candidate, time until the subject candidate is framed-out to the outside of the image taking area if the subject candidate is in the image taking area of the image taking unit, and time until the subject candidate is framed-in to the inside of the image taking area if the subject candidate is outside of the image taking area of the image taking apparatus.

According to another aspect of the present embodiment, the notification unit is a display unit, and indicates the subject candidate with a marker. Also, according to another aspect, the notification unit is a sound output unit and notifies the determined result by sound. Still further, according to another aspect of the present embodiment, if the subject candidate is out of the image taking area of the image taking unit, the notification unit notifies a positional relationship between the image taking unit and the image taking area.

According to still another aspect of the present embodiment, the image taking apparatus may further include a control unit configured to control the image taking unit so that the subject candidate enters the image taking area of the image taking apparatus if it is determined that the subject candidate is out of the image taking area. According to another aspect of the present embodiment, wherein the sensor unit is one of an image taking unit, a sound receiving unit, a temperature sensor, or an infrared sensor. Moreover, according the image taking unit and the sensor unit are configured to select an output area of an image signal from the same image taking element.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a flow chart of exemplary processing performed in transmitting an image from a camera device according to the sixth embodiment of the present invention.

FIG. 7 is a flow chart of exemplary processing in which the terminal device receives and displays the image according to the sixth embodiment of the present invention.

DETAILED DESCRIPTION OF THE EMBODIMENTS

Exemplary embodiments, features and aspects of the present invention will now be described in detail with reference to the drawings. It is noted that the relative arrangement of the components, the numerical expressions and numerical values set forth in these embodiments are not intended to limit the scope of the present invention unless specifically stated otherwise.

First Exemplary Embodiment

Figure 1:
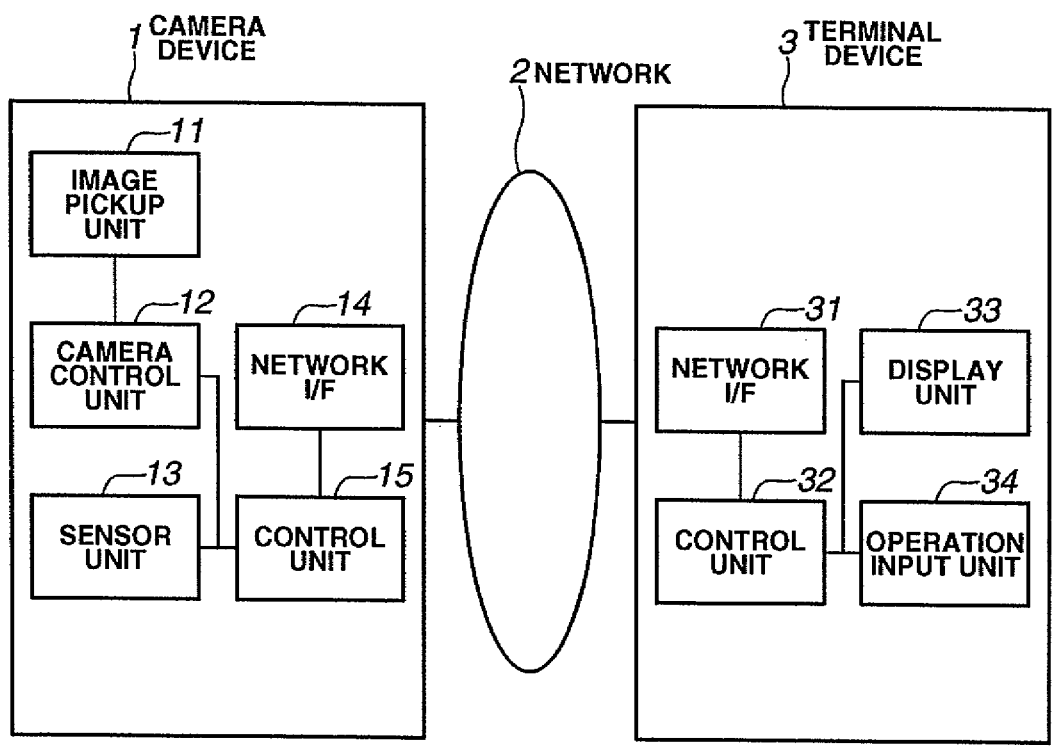
FIG. 1 is a schematic diagram that illustrates an exemplary configuration of network camera system according to a first embodiment of the present invention.

FIG. 1 is a schematic diagram that illustrates an exemplary configuration of a network camera system according to a first embodiment of the present invention. The network camera system is constituted by a camera device 1, a network 2, and a terminal device 3.

The camera device 1 includes an image pickup unit 11 that picks up an image, a camera control unit 12 that controls a direction of image taking, a zoom value, and an image taking processing, and a sensor unit 13 that detects a change of an environment in which the image taking is performed, based on a condition of light, a voice, a temperature, and the like. Further, the camera device 1 includes a control unit 15 that controls the entire camera device 1 and a network interface 14 that sends and receives data via the network 2. It is noted that the camera device 1 can change a shooting direction, which is, for example, of a slew type.

The terminal device 3 includes a display unit 33 that displays the image, an operation input unit 34 that receives an operation performed by a user, a control unit 32 that exercises control over the entire apparatus, and a network interface 31 that sends and receives data via the network 2.

The network camera system that has such a constitution can send the image data picked up by the image pickup unit 11 of the camera device 1 to the terminal device 3 and display the image on the display unit 33.

In addition, the network camera system that has such a constitution sends information of the operation performed through the operation input unit 34 of the terminal device 3 to the camera device 1, and, in response to the information, the camera control unit 12 changes and adjusts the shooting direction, the zoom value, and image capturing operations performed by the image pickup unit 11.

In this case, when the sensor unit 13 of the camera device 1 detects a change of the environment in which the image taking is performed and a position where the change occurs, the control unit 15 seeks a direction where the condition changes, relative to the shooting direction controlled by the camera control unit 12. Then, the control unit 15 sends information about the obtained direction where the condition changes, to the terminal device 3, while a notification of the condition change is issued.

Figure 2:
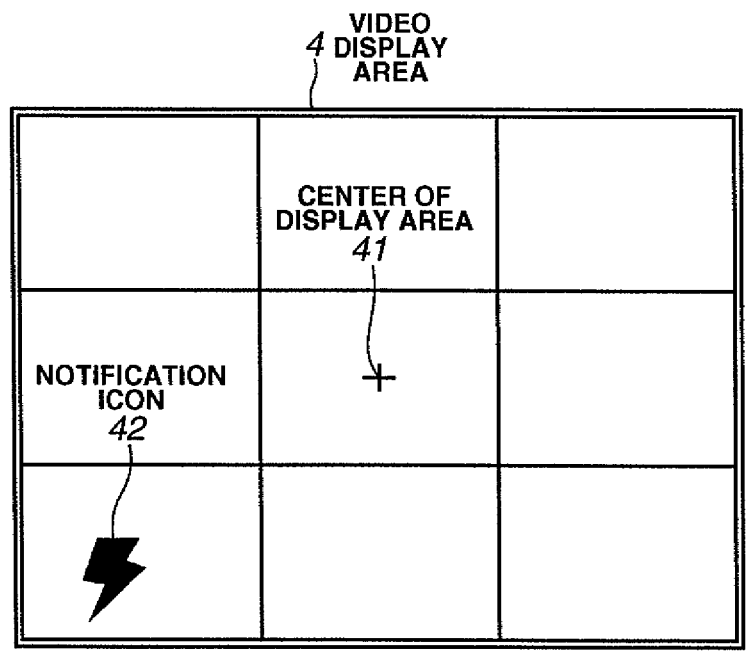
FIG. 2 is a schematic diagram that illustrates an example of a window displayed by a display unit of a terminal device according to the first embodiment of the present invention.

FIG. 2 illustrates an example of a window displayed by the display unit 33 of the terminal device 3 according to the first embodiment of the present invention. Reference numeral 4 denotes a video display area in which the image picked up by the image pickup unit 11 of the camera device 1 is displayed, and reference numeral 41 denotes a center of the video display area that is a center (i.e., the shooting direction) of the video display area 4. Reference numeral 42 denotes a notification icon that is displayed and superposed in the video display area 4 so as to notify the occurrence of the condition change and the direction of the condition change.

As shown in FIG. 2, the notification icon 42 is displayed in such a manner that the direction of the condition change is indicated. The display area center 41 serves as its reference. For example, the video display area 4 is divided and the notification icon 42 is displayed in a segmented area existing in the direction of the condition change while the display area center 41 (i.e., the shooting direction) serves as the reference. In this case, even when the video display area 4 is not divided, the notification icon 42 may take a shape that can specify and indicate the direction of the condition change, for example, an arrow-like shape that is oriented in the direction of the condition change.

In addition, the notification icon 42 may be configured to correspond to a kind of the condition change, for example, a kind of the sensor unit 13 (a light sensor, a voice sensor, a temperature sensor, and the like) that has detected the occurrence of the condition change.

The terminal device 3, when an operation for selecting the notification icon 42 is performed through the display unit 33 via the operation input unit 34, sends information of the operation to the camera device 1. In response to this information, the camera control unit 12 of the camera device 1 changes and adjusts the image pickup direction to the direction of the condition change. That is, the notification icon 42 serves as a trigger for changing and adjusting the image pickup direction of the camera device 1.

Second Exemplary Embodiment

In the first embodiment, the notification icon 42 is displayed in a superposed manner. However, the embodiment of the present invention is not limited to this constitution. Instead of the notification icon 42, the images of all areas that can be photographed by the camera device 1 may be stored in advance, and the image obtained by cutting off the area where the condition change occurs may be displayed.

Third Exemplary Embodiment

In the first embodiment and the second embodiment, the control unit 15 of the camera device 1 computes the direction of the condition change. However, the embodiment of the present invention is not limited to this constitution. Instead of the control unit 15, the terminal device 3 may compute the direction of the condition change. To be more specific, the sensor unit 13 of the camera device 1 detects the occurrence of the condition change and the position of the condition change in its peripheral. The sensor unit 13 notifies the occurrence of the condition change and the position where the condition changes, to the terminal device 3. Upon receipt of the notification of the information, the terminal device 3 computes the direction of the condition change relative to the shooting direction controlled by the camera control unit 12.

Fourth Exemplary Embodiment

In the first, the second, and the third embodiment, only the direction of the condition change is computed. However, the constitution of the present invention is not limited to this. That is, the zoom value suitable to capture the image of the area where the condition changes may be computed. To be more specific, when the sensor unit 13 of the camera device 1 detects the occurrence of the condition change and the position where the condition change occurs in its peripheral, a distance from the camera device 1 to the position where the condition change occurs and a range of the condition change are computed if it is possible depending on the type of the sensor unit 13. Then, the sensor unit 13 sends the information about the position of the condition change, the distance to the position of the condition change, and the range of the condition change to the terminal device 3, as well as the occurrence of the condition change to the terminal device 3. When the notification of the information is received, the terminal device 3 computes the direction of the condition relative to the shooting direction controlled by the camera control unit 12. In addition, the terminal device 3 computes the zoom value based on the received information of the distance to the position of the condition change and the range of the condition change. If the zoom value cannot be obtained by the computation, a previously-set zoom value or the current zoom value may be used as the zoom value.

As an example of the display by the display unit 33 of the terminal device 3, the notification icon 42 can be displayed as shown in FIG. 2 in proportion to a difference between the current zoom value and the computed zoom value. Namely, the notification icon 42 of a small size can be used if the computed zoom value is included in a telephoto side and the icon of a large size can be used if the computed zoom value is included in a wide angle side. Alternatively, the notification icon 42 can be displayed in a large size if the computed zoom value is included in the telephoto side and in a small size if the computed zoom value is included in the wide angle side.

When the notification icon 42 is selected through the display unit 33 via the operation input unit 34, the terminal device 3 sends information of the operation to the camera device 1. In response to the information, the camera control unit 12 of the camera device 1 changes and adjusts the shooting direction to the direction of the condition change, and changes the zoom value from the current zoom value to the computed zoom value. That is, the notification icon 42 serves as a trigger for changing and adjusting the image pickup direction of the camera device 1 and for changing the zoom value.

Fifth Exemplary Embodiment

Figure 3:
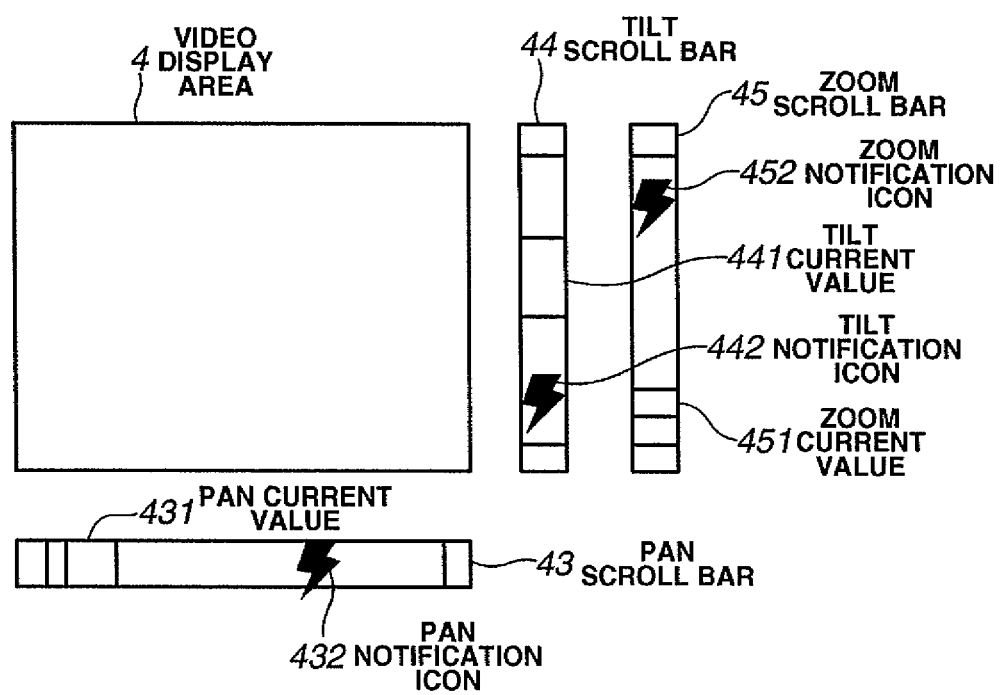
FIG. 3 is a schematic diagram that illustrates an example of a window displayed by a display unit of a terminal device according to a fourth embodiment of the present invention.

In a fifth embodiment of the present invention, the display by the display unit 33 of the terminal device 3 is altered. FIG. 3 illustrates an example of the display by the display unit 33 of the terminal device 3. Reference numeral 4 denotes a video display area in which the image picked up by the image pickup unit 11 of the camera device 1 is displayed.

Reference numeral 43 denotes a pan scroll bar that represents an operational range in a direction of panning. Reference numeral 431 denotes a pan current value that represents in the pan scroll bar 43 a pan position where the image taking is currently performed, and reference numeral 432 denotes a pan notification icon that represents in the pan scroll bar 43 a position corresponding to the area where the condition changes.

Reference numeral 44 denotes a tilt scroll bar that represents an operational range in a tilt direction, and reference numeral 441 denotes a tilt current value that represents in the tilt scroll bar 44 a tilt position where the image taking is currently performed. Reference numeral 442 denotes a tilt notification icon that represents in the tilt scroll bar 44 a position corresponding to the area where the condition changes.

In addition, reference numeral 45 denotes a zoom scroll bar that represents an operational range of the zoom, and reference numeral 451 denotes a zoom current value that represents in the zoom scroll bar 45 a current zoom value. Reference numeral 452 denotes a zoom notification icon that represents in the zoom scroll bar 45 a zoom value that is suitable to pick up the image of the area where the condition changes.

The sensor unit 13 of the camera device 1 detects the occurrence of the condition change and the position of the condition change in its peripheral. The sensor unit 13 notifies the occurrence of the condition change and the position where the condition change occurs, to the terminal device 3. In response to the notification, the terminal device 3 computes the direction of the condition change relative to the shooting direction controlled by the camera control unit 12, and computes a pan value and a tilt value to pick up the image of the area where the condition changes. Then the terminal device 3 displays the notification icons 432 and 442 on the scroll bars 43 and 44. In a case where the zoom value is computed as described in the fourth embodiment, the notification icon 452 is displayed on the scroll bar 45.

When an operation for selecting the pan notification icon 432, the tilt notification icon 442, or the zoom notification icon 452 is performed through the display unit 33 via the operation input unit 34, the terminal device 3 sends information of the operation to the camera device 1. In response to the information, the camera control unit 12 of the camera device 1 changes and adjusts the image pickup direction to the direction of the condition change. In addition, the camera control unit 12 changes the zoom value from the current zoom value to the computed zoom value. That is, the pan notification icon 432 and the tilt notification icon 442 serve as triggers for changing and adjusting the image pickup direction of the camera device 1, and the zoom notification icon 452 serves as a trigger for changing the zoom value.

Sixth Exemplary Embodiment

Figure 4:
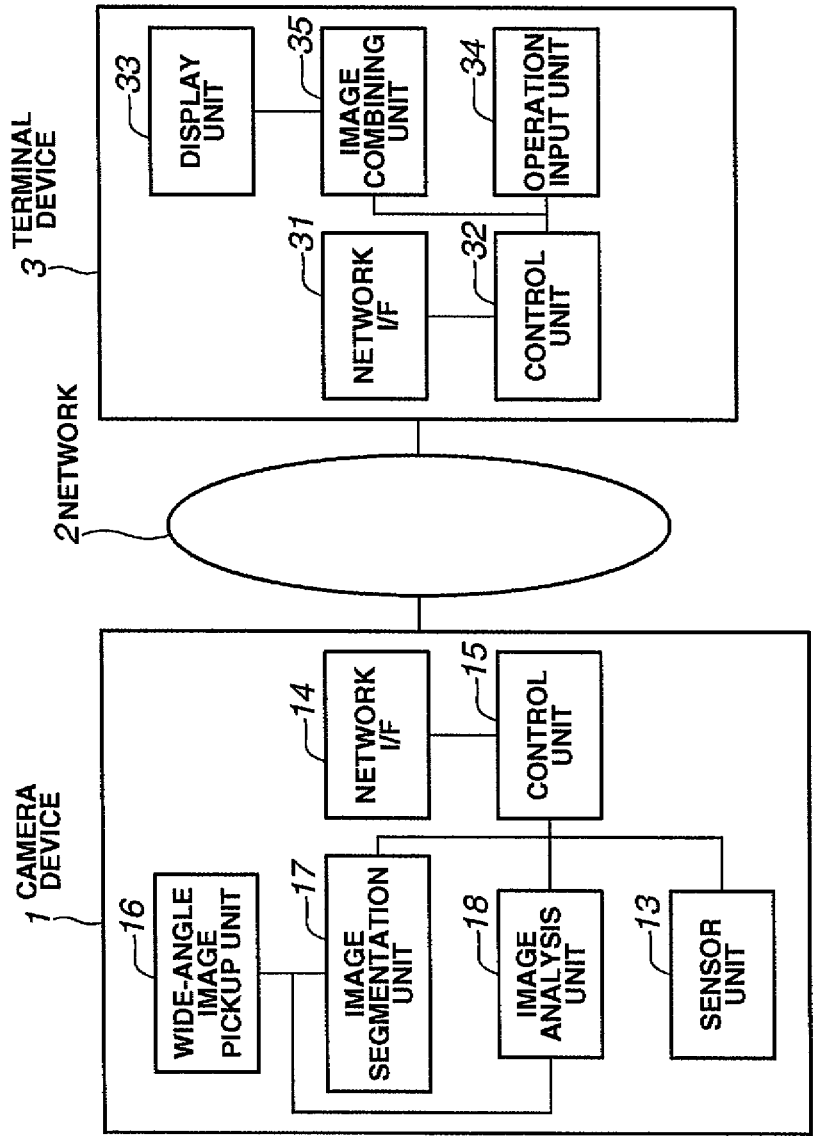
FIG. 4 is a schematic diagram that illustrates an exemplary configuration of a network camera system according to a sixth embodiment of the present invention.

FIG. 4 is a schematic diagram that illustrates an exemplary configuration of a network camera system according to a sixth embodiment of the present invention. The network camera system is constituted by the camera device 1 capable of a wide-angle shot, the network 2, and the terminal device 3.

With respect to a constitution of the camera device 1, and in particular, components that have not yet been described with reference to FIG. 1, reference numeral 16 denotes a wide angle image pickup unit capable of picking up the image with a wide angle by using a fisheye lens, a rotational symmetrical mirror, and the like. Reference numeral 17 denotes an image cutting off unit that cuts off the area to be transmitted to the terminal device 3, out of the image picked up by the wide-angle image pickup unit 16. Reference numeral 18 denotes an image analysis unit that detects a change in the condition such as a movement, a person (that is, a face or a whole part of a person), and a color, by analyzing the image picked up by the wide-angle image pickup unit 16.

As to a constitution of the terminal device 3, an in particular, components that have not yet been described with reference to FIG. 1, reference numeral 35 denotes an image combining unit that superposes the image to be displayed on the display unit 33 with other images.

In the network system having such a configuration, the area specified through the terminal device 3 can be cut off out of the image picked up by the wide-angle image pickup unit 16 of the camera device 1 using the image cut off unit 17. The cut off image is sent to the terminal device 3, and displayed on the display unit 33. That is, the camera device 1 can change the area of the image to be cut off by the image cut off unit 17 in accordance with the operation performed through the operation input unit 34 of the terminal device 3. The cut off area is sent to the terminal device 3. The received image serves as a main image.

When the condition change of the movement, the person, and the color and the position of the condition change is detected by the image analysis unit 18 of the camera device 1, the image cut off unit 17 cuts off the area where the condition changes, out of the image taken by the wide-angle image pickup unit 16. Then, the information about the cut off area where the condition changes s is sent to the terminal device 3 together with the main image. Thus, the image obtained by cutting off the condition change area can be superposed onto the main image and displayed on the display unit 33 of the terminal device 3.

When the sensor unit 13 of the camera device 1 detects the occurrence of the condition change in its peripheral and the position of the condition change, the image cut off unit 17 also cuts off the condition change area out of the image taken by the wide-angle image pickup unit 16, and the cut off image is sent to the terminal device 3 together with the main image. Thus, the image obtained by cutting off the condition change area can be superposed onto the main image and displayed on the display unit 33 of the terminal device 3.

Figure 5:
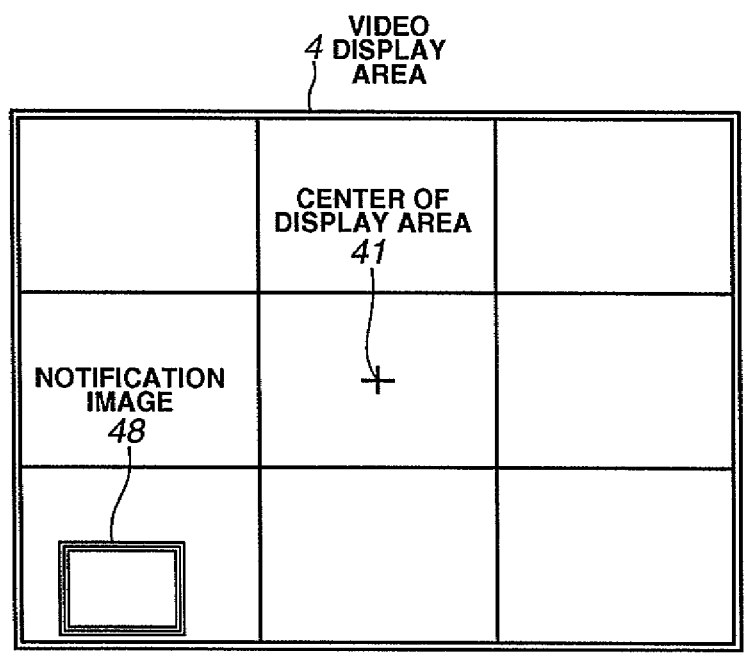
FIG. 5 is a schematic diagram that illustrates an example of a window displayed by a display unit of a terminal device according to a sixth embodiment of the present invention.

FIG. 5 is a schematic diagram that illustrates an exemplary window displayed by the display unit 33 of the terminal device 3. Reference numeral 4 denotes a video display area in which the main image is displayed; reference numeral 41 denotes a center of the display area that is a center of the video display area 4; and reference numeral 48 denotes a notification image that is superimposed and displayed in the video display area 4 to notify the occurrence of the condition change and the direction of the condition change. The image is obtained by cutting off the condition change area as described above.

As shown in FIG. 5, the notification image 48 is displayed in such a manner that the direction of the condition change is indicated while the display area center 41 serves as the reference. For example, the video display area 4 is divided and is displayed in a divided area existing in the direction of the condition change relative to the display area center 41.

In addition, the notification image 48 can be formed as an image that corresponds to a kind of the condition change, for example, a kind of the sensor unit 13 (a light sensor, a voice sensor, a temperature sensor, and the like) that has detected the occurrence of the condition change. Further, the notification image 48 may be an image that corresponds to the kind of the movement, person, and color analyzed by the image analysis unit 18 that has detected the condition change.

When the notification image 48 is selected through the display unit 33 via the operation input unit 34, the terminal device 3 sends information of the selection to the camera device 1. In response to the information, the camera control unit 12 of the camera device 1 changes the image displayed by the terminal device 3 from the main image to the image obtained by cutting off the area which includes the condition change area. That is, the notification image 48 serves as a trigger for changing the image displayed by the terminal device 3 from the main image to the image obtained by cutting off the area including the condition change area.

Hereinbelow, exemplary processing in the network camera system according to the sixth embodiment is described in further detail. FIG. 6 is a flow chart of a processing in transmitting the image from a camera device 1. FIG. 7 is a flow chart of a processing in which the terminal device 3 receives and displays the image.

The processing shown in FIG. 6 is executed in parallel with the processing in which the image cut off unit 17 cuts off the area specified through the terminal device 3 out of the image picked up by the wide-angle image pickup unit 16 of the camera device 1 and sends the data of the cut off area to the terminal device 3.

Now referring to FIG. 6, first, the image analysis unit 18 obtains a latest image from the wide-angle image pickup unit 16 (step S01). The image obtained here is a wide-angle image picked up by the wide-angle image pickup unit 16. Next, a determination is made as to whether a wide-angle image for comparison obtained just before in step S01, exists in a buffer of the image analysis unit 18 (step S02).

If it is determined that there exists the wide-angle image in the buffer, the wide-angle image in the buffer and the wide-angle image obtained in step S01 are analyzed and compared to each other to compute an amount of change (step S03). For carrying out the analysis and the comparison, for example, it is considered whether the variance occurs between images, pixel by pixel, or block by block, to where a similar pattern has been displaced between images, whether there exists a pattern that matches a face of a person. In addition, it can be considered whether the face of the person has been displaced between images, whether there exists the area that matches a specific color, and whether the specific color has been displaced between images. The amount of change is computed by performing the above method of analyzing and comparing or by combining two or more of such methods, so that the wide-angle images are mutually compared.

Then, a determination is made as to whether a condition change has occurred, based on whether the amount of change obtained by the comparison between the wide-angle images exceeds a threshold value previously set per each analysis method or the threshold previously set by combining the analysis methods (step S04). If it is determined that the condition change has occurred, the information about the condition change area is sent from the image analysis unit 18 to the image cut off unit 17. Then, the image cut off unit 17 cuts off the condition change area out of the wide-angle image, and the data of the cut off area is sent to the terminal device 3 (step S05).

After step S05, or if the wide-angle image has not been stored in the buffer in step S02, or if there is no variance between the wide-angle images in step S04, the wide-angle image obtained in step S01 is stored in the buffer of the image analysis unit 18 (step S06). If only one image is to be stored in the buffer, the image is stored by overwriting. If a plurality of images is to be stored in the buffer, the plurality of images is stored while oldest images are deleted.

The exemplary processing shown in FIG. 7 is performed when the terminal device 3 receives the main image from the camera device 1, displays the received main image on the display unit 33, and when the image of the condition change area which is cut off in step S05 as shown in FIG. 6 is sent to the terminal device 3.

Referring to FIG. 7, first, when the camera device 1 receives the cut off image of the condition change area from the camera device 1, the main image area of the wide-angle image and the condition change area is computed (step S07). Next, a ratio of the condition change area to the main image area is computed. If the ratio exceeds a predetermined threshold value, it is determined that the condition change area exists in the main image (step S08), and in this case, the main image is displayed as it is (step S11). This is because, if the main image includes the condition change area, the cut off image of the condition change area does not need to be superposed on the main image.

If it is determined that the condition change area is not included in the main image area (step S08), a vector oriented from the center of the main image area to the center of the condition change area is computed (step S09). Then, the position and the size of the image whose condition change area is cut off and superposed onto the main image, are computed based on the computed vector. The cut off image is superposed (step S10), and the resultant image is displayed on the display unit 33 (step S11). AS an example of computing the position of the cut off image of the condition change area, a method may be employed such that a position going from the center of the main image in a vector direction and at a constant distance from an edge of the main image may be defined as a superposing position. In addition, as a method of computing the size of the cut off image of the condition change area, a method can be employed such that the size of the image is computed by multiplying the condition change area by the ratio of the condition change area to the main image, and also by a coefficient that is in an inverse proportion or a direct proportion to the size of the vector. The coefficient, for example, can be determined such that the superposing area to be small when the vector is large (when the distance is large) and allows the superposing area to be large when the vector is small (when the distance is small).

It is also noted that in the present embodiment, the icon as described in the first embodiment may be utilized instead of the notification image 48.

Seventh Exemplary Embodiment

Figure 8A:
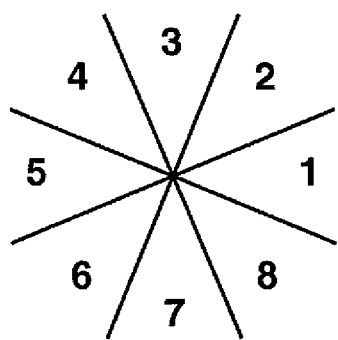
FIGS. 8A and 8B are diagrams that illustrate an exemplary method of computing a position of an image which shows an area where a condition change occurs, according to a seventh embodiment of the present invention.
Figure 8B:
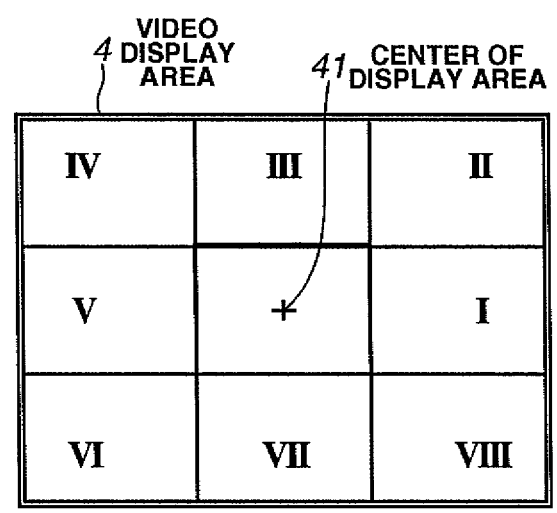

In a seventh embodiment, as an example, a method of computing the position of the cut off image of the condition change area and superposing onto the main image is described which is shown in step S10 of the flow chart in FIG. 7. FIG. 8A is a diagram that illustrates a distribution of angles of vectors oriented from the main image area center to the condition change area center. FIG. 8B is a diagram that illustrates on which portion of the video display area 4, the condition change area is superposed based on the distribution of the angles of the vectors.

If the distribution is determined to be the angle "1" in FIG. 8A, the condition change area is superposed onto the video display area "I" in FIG. 8B. In this way, "2" is superposed onto "II", "3" onto "III", "4" onto "IV", "5" onto "V", "6" onto "VI", "7" onto "VII", and "8" onto "VIII".

As a method of distributing the angles as shown in FIG. 8A, the angles are distributed evenly by 45 degrees. In addition, an aspect ratio of the video display area 4 is 4:3, and therefore there are two distribution methods of the angles shown in FIG. 8A that are calculated by approximation. In each of the two methods, the angles are respectively set to an angle (1) and an angle (2) as shown in Table 1 below.

TABLE 1

| Distribution | Angle (1) | Angle (2) |
|---|---|---|
| 1 | 3 × 60/7 | 3 × 180/17 |
| 2 | 60 | 5 × 180/17 |
| 3 | 4 × 60/7 | 4 × 180/17 |
| 4 | 60 | 5 × 180/17 |
| 5 | 3 × 60/7 | 3 × 180/17 |
| 6 | 60 | 5 × 180/17 |
| 7 | 4 × 60/7 | 4 × 180/17 |
| 8 | 60 | 5 × 180/17 |

Eighth Exemplary Embodiment

Figure 9:
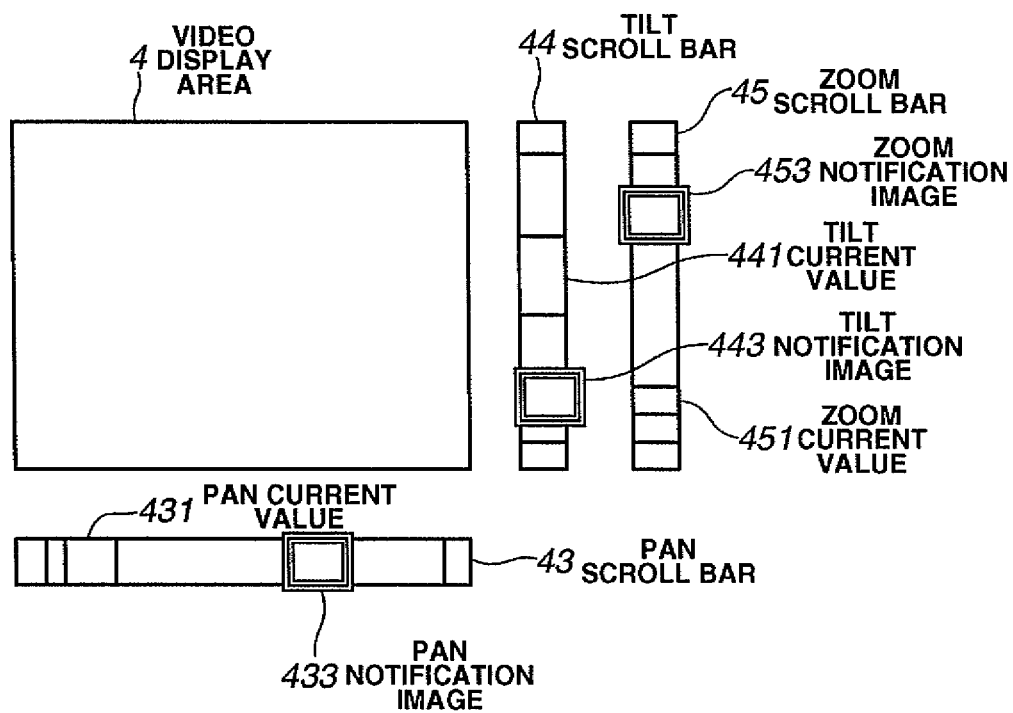
FIG. 9 is a schematic diagram that illustrates an example of a window displayed by a display unit of a terminal device according to an eighth embodiment of the present invention.

In an eighth embodiment of the present invention, the display on the display unit 33 of the terminal device 3 is altered. FIG. 9 illustrates a window displayed by the display unit 33 of the terminal device 3. Reference numeral 4 denotes a video display area in which the main image is displayed. Reference numeral 43 denotes a pan scroll bar that represents an operational range in a pan direction, and reference numeral 431 denotes a pan current value that represents in the pan scroll bar 43 a pan position that is currently cut off as the main image. Reference numeral 433 denotes a pan notification image that represents in the pan scroll bar 43 a portion corresponding to the condition change area.

Reference numeral 44 denotes a tilt scroll bar that represents an operational range in a tilt direction, and reference numeral 441 denotes a tilt current value that represents in the tilt scroll bar 44 a tilt position currently cut off as the main image. Reference numeral 443 denotes a tilt notification image that represents in the tilt scroll bar 44 a position corresponding to the condition change area.

Reference numeral 45 denotes a zoom scroll bar that represents an operational range of the zoom, and reference numeral 451 denotes a zoom current value that represents in the zoom scroll bar 45 a current zoom value. Reference numeral 453 denotes a zoom notification image that represents in the zoom scroll bar 45 a zoom value that is suitable to pick up the image of the condition change area.

The sensor unit 13 and the image analysis unit 18 of the camera device 1 detect the condition change and the position of the condition change. In that case, the image of the condition change area cut off by the image cut off unit 17 is sent to the terminal device 3, together with the main image. In response to the information, the terminal device 3 computes a pan value, a tilt value, and a zoo value so that the condition change position becomes the main image, and displays the cut off image of the condition change area, as the pan notification image 483, the tilt notification image 443, and the zoom notification image 453 respectively. In this embodiment, the cut off image of the condition change area is displayed with respect to each of the pan notification image 483, the tilt notification image 443, and the zoom notification image 453. However, the present invention is not limited to this embodiment. That is, the cut off image of the condition change area can be displayed for either one of the pan notification image 483, the tilt notification image 443, or the zoom notification image 453, and other image is displayed for the other notification images. Otherwise, the icon can be displayed instead of the image.

When an operation for selecting the pan notification image 483, the tilt notification image 443, or the zoom notification image 453 is performed through the display unit 33 via the operation input unit 34, the terminal device 3 sends information of the operation to the camera device 1. In response to the information, the camera device 1 changes the image displayed by the terminal device 3 from the main image to the image including the condition change area. That is, the pan notification image 483 and the tilt notification image 443 serve as triggers for changing the image displayed by the terminal device 3 to the image including the condition change area, and the zoom notification image 453 serves as a trigger for changing the zoom value.

Ninth Exemplary Embodiment

Figure 10:
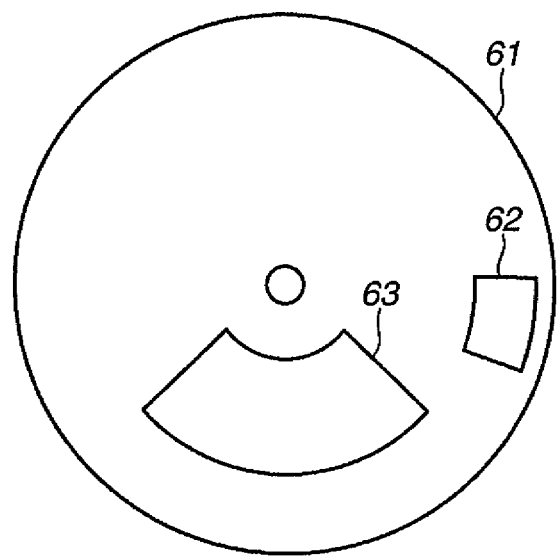
FIG. 10 is a schematic diagram that illustrates a positional relationship of areas for an omnidirectional image according to a ninth embodiment of the present invention.

The camera device 1 described in the sixth embodiment may be an omnidirectional camera whose wide-angle image pickup unit 16 has a visual field area of 360 degrees at a maximum. FIG. 10 is a schematic diagram that illustrates a positional relationship between areas. Reference numeral 61 denotes all areas of an omnidirectional image picked up by the wide-angle image pickup unit 16. Reference numeral 62 denotes an image analysis unit 18 that is the condition change area of the movement, the person, the color and the like. Reference numeral 63 denotes the area of the main image specified through the terminal device 3.

In FIG. 10, when the positional relationship of the condition change area 62 is measured relatively with the area of the main image 63 serving as the center, the condition change area 62 is positioned to the right of the main image area 63. That is, the condition change area 62 is positioned closer to the circumference than the main image area 63. Further, in a case of the omnidirectional camera in which the circumference is considered to be a underside, the condition change occurs in a lower right direction of the area cut off as the main image. The image combining unit 35 superposes the cut off image of the condition change area 62 (notification image 48) onto the main image, based on a direction where the condition change occurs relative to the main image area 63.

Tenth Exemplary Embodiment

If a plurality of terminal devices 3 is connected to the camera device 1, the control unit 15 manages the main image area specified through each of the plurality of terminal devices 3, and the image cut off unit 17 cuts off the main image with respect to each terminal device 3. When the sensor unit 13 and the image analysis unit 18 detects the condition change and the position of the condition change, the image cut off unit 17 cuts off the image of the condition change and the data of the cut off image is sent to each of the terminal devices 3. In each of the terminal devices 3, the image combining unit 35 superposes the cut off image of the condition change area (the notification image 48) onto the main image and displays the superposed image on each image display unit 33.

In this case, the image can be superposed and displayed only on some of the terminal devices 3, instead of superposing and displaying the cut off image of the condition change area onto the main image in all the terminal devices 3. For example, if the condition change area is included in the area of at least one main image, a transmission of the cut off image of the condition change area to the terminal device 3 receiving the main image is suspended. This is because the terminal device 3 that displays the main image needs not superpose the notification image 48 if the main image includes the condition change area.

Further, the terminal device 3 can be selected in which main image is the area that is the closest to the condition change area in the wide-angle image (or the omnidirectional image). The notification image 48 is superposed only on the selected terminal device 3.

Eleventh Exemplary Embodiment

If the sensor unit 13 and the image analysis unit 18 have detected a plurality of condition changes, a plurality of notification images 48 (or the notification icons 42) that corresponds to each conditional change can be superposed and displayed.

Figure 11:
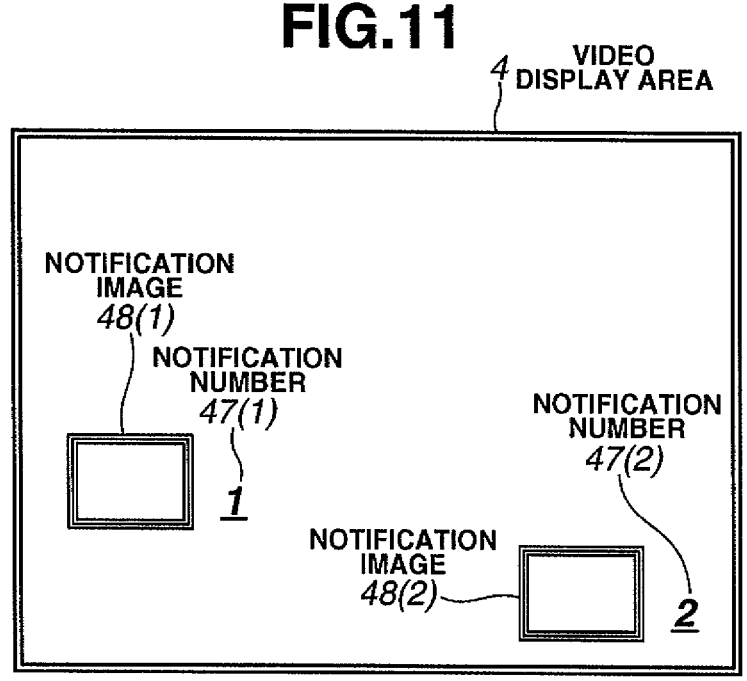
FIG. 11 is a schematic diagram that illustrates an example of a window displayed by a display unit of a terminal device according to an eleventh embodiment of the present invention.

FIG. 11 is a window displayed by the display unit 33 on the terminal device 3. There arises a case where, while a first condition change occurs and a first notification image 48 (1) is being displayed, a next condition change is detected. In this case, a notification number 47 (1) is displayed in the vicinity of the first notification image 48 (1). Additionally, a notification image 48 (2) and a notification number 47 (2) of the nest condition change are displayed. The notification numbers are provided with a unique number in an ascending order from earlier notification, or otherwise, in an order from later notification.

In the same way, when a third condition change or beyond the third is notified, the notification image 48 and the notification number 47 are mutually superposed and displayed. If the plurality of notification images 48 is overlapped and displayed, the notification image 48 of an earlier notification may be displayed on the front, or otherwise, the notification image 48 of a later notification can be displayed on the front. Or alternatively, notification image 48 of a higher priority that is specified in advance can be displayed on the front. Such priority can be determined depending on the kind of the sensor that has detected the condition change, the kind of the image analysis, and the range of the detection.

When the condition change ends or a given period of time has elapsed, the notification image 48 is cleared. At that stage, the notification number 47 related to the notification image 48 is cleared at the same time. In addition, when the notification image 48 and the notification number 47 are cleared, the number of remaining notification image 47 is updated. When the notification image and the notification number 47 are cleared and if there is only one notification image 48 left, the notification number 47 related to the remaining notification image 48 is also cleared.

Figure 12:
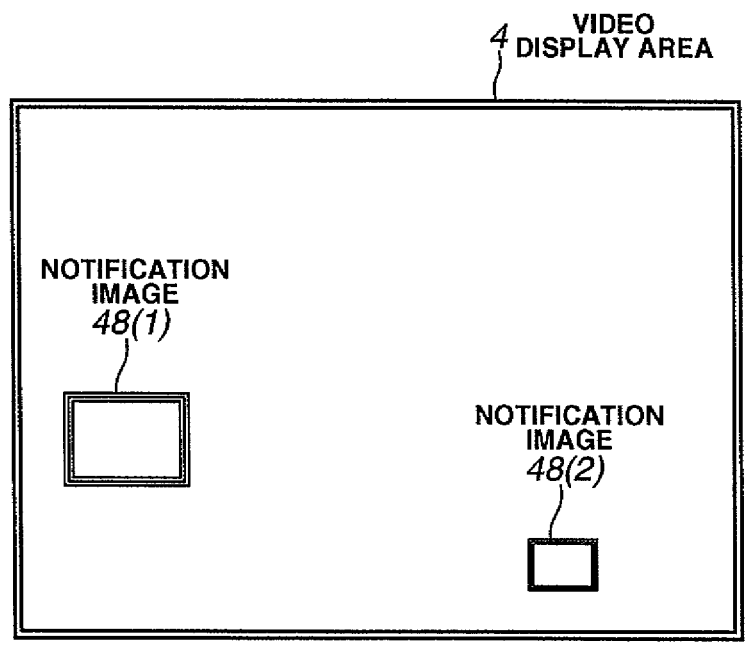
FIG. 12 is a schematic diagram that illustrates an example of a window displayed by a display unit of a terminal device according to the eleventh embodiment of the present invention.

FIG. 12 is a window displayed on the display unit 33 of the terminal device 3. When a next condition change is detected while a first condition change occurs and a first notification image 48 (1) is displayed, a second notification image 48 (2) is displayed in a size smaller than the size of the notification image 48 (2) displayed in an ordinary case. If a third condition change or beyond the third is detected, the notification image 48 (2) is displayed by a larger reduction ratio by which the notification image 48 (2) is displayed smaller than a previous notification image 48.

On the other hand, conversely, when the first notification image 48 (1) is displayed and if a next condition change is detected in the mean time, the first notification image 48 (1) can be displayed in a size smaller than display in an ordinary case, and the second notification image 48 (2) can be displayed in the size of the ordinary case. If a third condition change or beyond the third is detected, the notification image 48 that has been displayed so far is further reduced from the size of display until then. The notification image 48 that is notified latest is displayed in the ordinary size, and the notification images that have been notified before the latest-notified notification image 48 are displayed in smaller sizes than before at a reduction ratio that increases gradually in a notification order.

If the plurality of displayed notification images 48 are overlapped, the notification image 48 of an earlier notification may be displayed on the front, or otherwise, the notification image 48 of a later notification can be displayed on the front. Or alternatively, the notification image 48 of a higher priority that is specified in advance can be displayed on the front. Such priority can be determined depending on the kind of the sensor that has detected the condition change, the kind of the image analysis, and the range of the detection.

When the condition change ends or a given period of time has elapsed, the notification image 48 is cleared. At that stage, the size of the remaining notification image 48 is updated.

Twelfth Exemplary Embodiment

Figure 13:
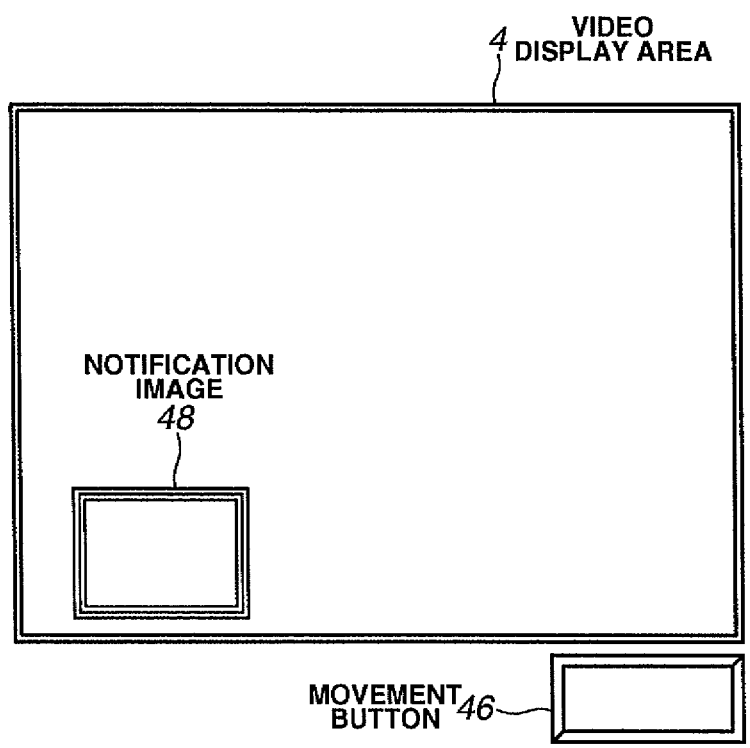
FIG. 13 is a schematic diagram that illustrates an example of a window displayed by a display unit of a terminal device according to a twelfth embodiment of the present invention.

In the above embodiments, the examples are described in which the notification icon 42 or the notification image 48 displayed by the display unit 33 of the terminal device 3 serves as a trigger for changing the display image. However, as shown in FIG. 13, a movement button 46 for changing the display image can be separately provided, as shown in FIG. 13. There is a case where the occurrence of the condition change is notified by the notification image 48 and the notification icon 42 in the video display area 4. In such a case, by pressing the movement button 46, the image taking direction can be changed to the direction of the condition change and the image displayed on the terminal device 3 can be changed from the main image to the image including the condition change area.

Thirteenth Exemplary Embodiment

In Japanese Patent Application Laid-Open No. 2004-320286, a camera device which has a mechanism that extracts information about a predetermined feature part out of image data and performs zooming to a predetermined area including the predetermined feature part, and a camera device configured to superpose and display a feature part with a marker on a screen are proposed. However, in the above devices, if the target feature part does not exist in an image angle of the camera device for image taking, it is not possible to extract information about the feature part, and, therefore, zooming and marking is not performed. Accordingly, in order to perform the information extraction, a photographer has to move the device so that the feature part enters in the image angle for image taking. Moreover, sometimes the photographer does not notice that the feature part exists outside of the image angle for image taking and fails to capture the feature part. In the thirteenth embodiment, in such a camera device, even if a desired subject exists outside of the image angle of the camera device for image taking, it can be possible to detect the existence of the subject. The thirteenth embodiment will be described in detail.

Figure 14:
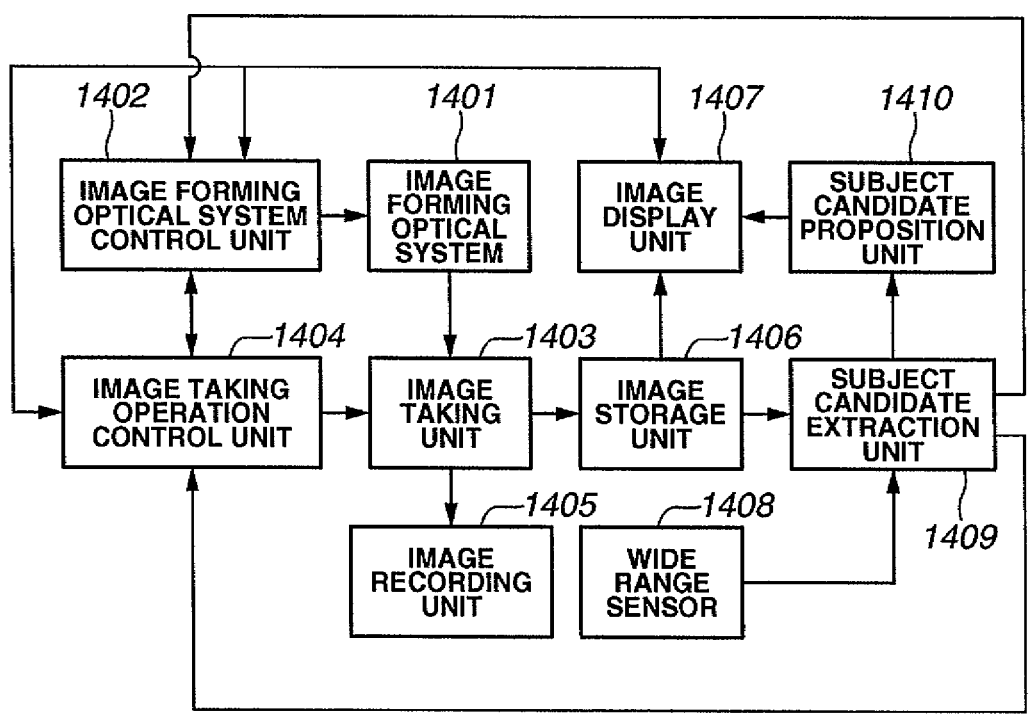
FIG. 14 is a block diagram that illustrates an exemplary functional diagram of a camera device according to a thirteenth embodiment of the present invention.

FIG. 14 is a block diagram that illustrates a functional constitution of a camera device 1400 according to the thirteenth embodiment of the present invention. As shown in FIG. 14, the camera device 1400 includes an image forming optical system 1401, an image forming optical system control unit 1402, an image taking unit 1403, an image taking operation control unit 1404, an image recording unit 1405, an image storage unit 1406, an image display unit 1407, a wide range sensor 1408, a subject candidate extraction unit 1409, and a subject candidate proposition unit 1410.

The image forming optical system 1401 has optical lenses equipped with a zoom mechanism. Moreover, the image forming optical system 1401 can include a drive mechanism in a pan axis direction and tilt axis direction.

The image forming optical system control unit 1402, in response to an instruction from the photographer or based on information from the image taking operation control unit 1404 and the subject candidate extraction unit 1409, which will be described below, controls a zoom in the image forming optical system 1401, or, depending on a configuration of the image forming optical system 1401, a drive control in a pan direction and a tilt direction.

The image taking unit 1403 is a video input means which includes a video sensor, a sensor signal processing circuit, and a sensor driving circuit. As the video sensor, typically, a CCD or a CMOS image sensor is used, and in response to a control signal readout from the sensor driving circuit (not shown), a predetermined video signal (for example, a signal obtained by subsampling, or block readout) is output as image data.

The image taking operation control unit 1404 outputs the readout control signal to the sensor driving circuit of the image taking unit 1403 and controls a timing of actual image taking based on an instruction (image angle adjustment instruction, depression of shutter, or the like) from the photographer, and information from the image forming optical system control unit 1402 and the subject candidate extraction unit 1409.

The image recording unit 1405 records image data on an external medium or the like. While, the image storage unit 1406 is composed of a semiconductor memory or the like, temporarily stores the image data transferred from the image taking unit 1403, and in response to an request from the image display unit 1407 and the subject candidate extraction unit 1409, transfers the image data to the image display unit 1407 and the subject candidate extraction unit 1409 at a predetermined timing.

The image display unit 1407 displays the taken image. Typically, a liquid crystal monitor is used. The image display unit 1407 can be an electronic viewfinder (EVF). Moreover, the image display unit 1407 can include a display unit configured to display a menu in conjunction with an operation unit that enables the photographer to select an image taking mode or the like. An image is displayed after a predetermined process is performed to the image data transferred from the image storage unit 1406 based on the information of the image forming optical system control unit 1402.

The wide range sensor 1408 performs sensing throughout an area wider than the area displayed on the image display unit 1407, and the image sensor which outputs an image signal similar to the image taking unit 1403, can be used. Moreover, the wide range sensor 1408 can be a sound receiving device composed of a sound receiving microphone and an amplifier which amplifies an audio signal. Further, a known sensor such as a temperature sensor which senses temperature, or an infrared sensor, can be used depending on a subject to be detected. In the thirteenth embodiment, a case in which an image sensor is used will be described.

The subject candidate extraction unit 1409 detects a subject candidate which belongs to a specific category out of the output data of the wide range sensor 1408 and the image data output from the image taking unit 1403, and extracts information about the subject candidate. The subject candidate extraction unit 1409 exists as a program which is executed in an application specific integrated circuits (ASIC), or a processor (reconfigurable processor, DSP, CPU, or the like). It is possible that a subject candidate which belongs to a desired specific category is extracted by registering in advance according to a predetermined procedure, and providing a plurality of program modules for detecting a specific category. Depending on the specific category designated by the photographer, the program module is dynamically loaded and performed.

The subject candidate proposition unit 1410 presents information about the subject candidate output from the subject candidate extraction unit 1409 to the photographer. For example, on the image display unit 1407, information about a position, or size of the subject is highlighted by an arrow. Moreover, using an audio speaker to generate electronic sound, or using audio to present information about a subject candidate to the photographer is considered. The above-described each block is not always necessary to be integrally configured as the camera device 1400. For example, as described in the first embodiment, each of the blocks can be connected to a terminal device through a network I/F and the image display unit 1407 can be included in the terminal device side.

Figure 15:
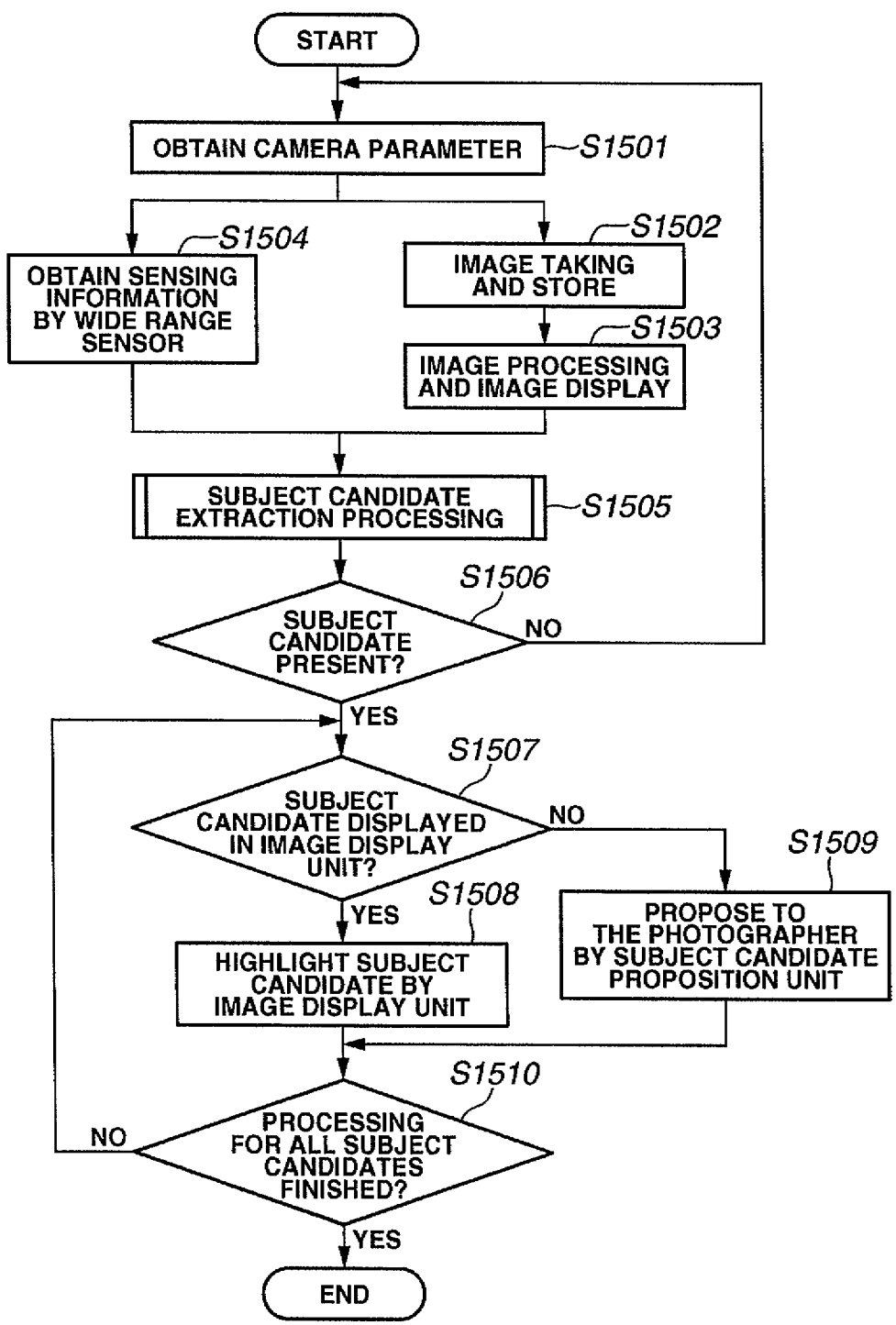
FIG. 15 is a flow chart of exemplary subject candidate detection processing according to the thirteenth embodiment of the present invention.

FIG. 15 is a flow chart that illustrates an exemplary processing for proposing a subject candidate in the camera device according to the thirteenth embodiment of the present invention. First, the image display unit 1407 obtains camera parameters of an image forming optical system, such as a focal length, an image angle, a distortion coefficient, a direction of pan, a direction of tilt from the image forming optical system control unit 1402 or the image taking operation control unit 1404 (step S1501). Then, an image is taken by the image taking unit 1403, and the obtained image data is temporarily stored in the image storage unit 1406 (step S1502).

In parallel with the processing at step S1502, sensing is performed by the wide range sensor 1408 (step S1504). To the image data stored in the image storage unit 1406 at step S1502, a predetermined image processing is performed in the image display unit 1407 based on the camera parameters obtained at step S1501 and the image is displayed (step S1503). The predetermined image processing is, for example, an aberration correction for correcting a distortion in the image forming optical system 1401, or a processing of converting brightness. Further, a processing of converting a resolution of the image data is performed to fit the resolution of the image display unit 1407. If, for example, a processing speed is important, the predetermined image processing may be partially performed or may not be performed.

Then, a subject candidate extraction processing is performed by the subject candidate extraction unit 1409 by using the sensing information transferred from the wide range sensor 1408 and the image data transferred from the image storage unit 1406 (step S1505). The subject candidate extraction processing will be described below in detail. If there exists a subject candidate (YES at step S1506), the process moves to step S1507. If there is no subject candidate (No at step S1506), the process returns to step S1501.

If there exists the subject candidate, as to one of the subject candidates, the subject candidate proposition unit 1410 determines whether the subject candidate is displayed on the image display unit 1407, that is, whether the subject candidate is included in the images taken by the image taking unit 1403 (step S1507). If the subject candidate is displayed on the image display unit 1407, the subject candidate proposition unit 1410 highlights the subject candidate by a marker or the like on the image display unit 1407 at step S1508. On the other hand, if the subject candidate is not displayed on the image display unit 1407, that is, if it is the subject information extracted from the information output from the wide range sensor 1408, the process moves to step S1509 and notifies the photographer of the information of the subject candidate. The processing at step S1507 through step S1509 is performed to all subject candidates (until it becomes to YES at step S1510).

Figure 16:
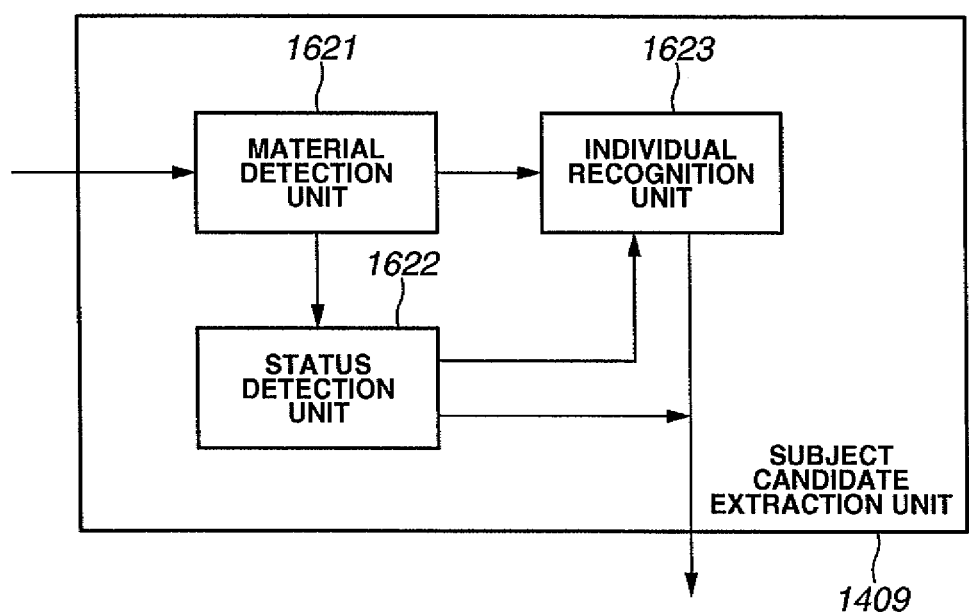
FIG. 16 is a block diagram that illustrates an exemplary configuration of a subject candidate extraction unit according to the thirteenth embodiment of the present invention.

Next, the subject candidate extraction processing performed at step S1505 will be described in detail. FIG. 16 is a block diagram that illustrates an exemplary configuration of the subject candidate extraction unit 1409. A material detection unit 1621 detects a material which belongs to a predetermined specific category out of the image data input from the image storage unit 1406 and the data input from the wide range sensor 1408. The size of the detected specific category is variable. As to the types of the categories, it can be classified, for example, into a large classification such as a person, a vehicle, a middle classification in which an older person or a younger person, a male or a female, and the like can be determined among persons, and a small classification in which a specific person can be detected. Here, for the description, it is supposed that the specific category is a face of person. A status detection unit 1622 detects a status of an object detected by the material detection unit 1621. In a case of a face of person, a size, an angle, an age, a sex, an expression of the face, and the like are detected. An individual recognition unit 1623 performs individual recognition of the object, in a case of a person, recognizes an individual person.

Figure 17:
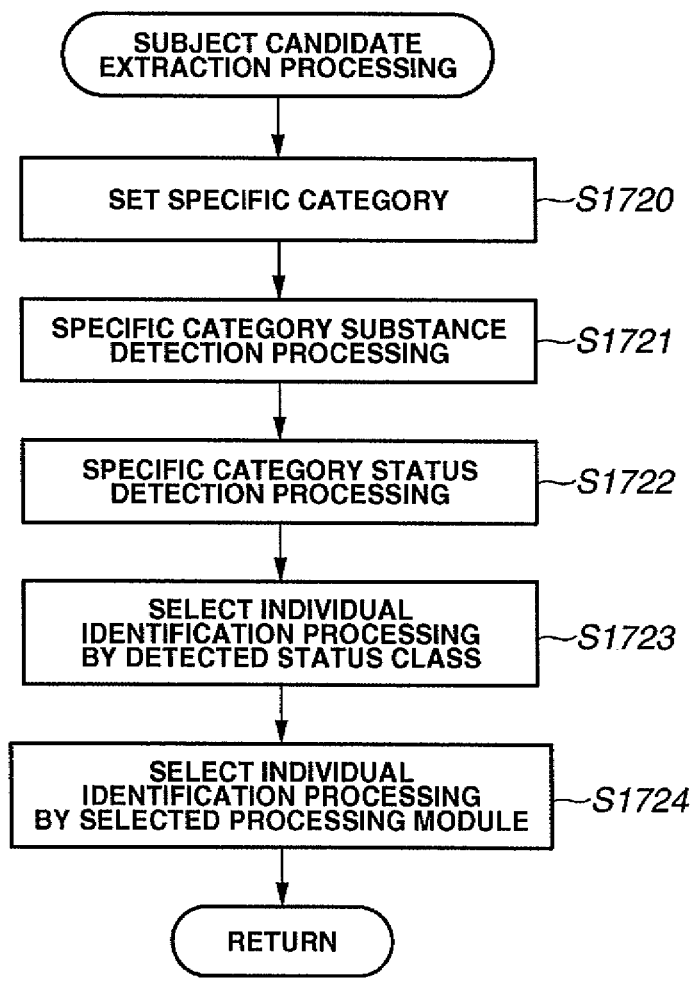
FIG. 17 is a flow chart of exemplary subject candidate extraction processing performed in the subject candidate extraction unit according to the thirteenth embodiment of the present invention.

With reference to a flowchart in FIG. 17, the subject candidate extraction processing procedure will be described. Depending on an direct instruction from the photographer or a mode of the camera device 1400 (scenery photographing mode, portrait photographing mode, close-up view photographing mode, distant view photographing mode, or the like), a specific category of a material to be extracted is set (step S1720). Then, the material detection unit 1621 performs material detection processing of the set specific category (step S1721). For example, if the set specific category is a specific person, first, face detection is performed. Then, the status detection unit 1622 performs a status detection processing to the detected material of the specific category (step S1722). If the detected material of the specific category is a parson, after the tilt of the face, the size, or the like are detected, further, a shape or a positional relationship of eyes, a nose, a mouth which is to be a feature amount to represent a sex, a individual, or an expression, is detected, and the status of the face is searched. Further, a processing module for individual identification based on the detected status which is provided in the individual recognition unit 1623 is selected (step S1723), and a individual identification processing such as a determination of the face of the individual is performed (step S1724).

Figure 18:
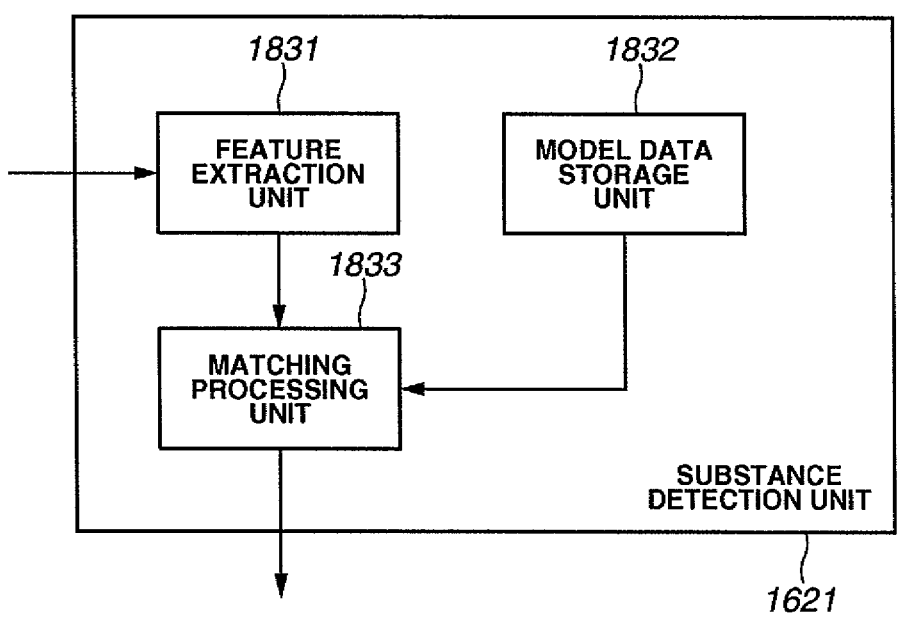
FIG. 18 is a block diagram that illustrates an exemplary configuration of a material detection unit according to the thirteenth embodiment of the present invention.

The material detection unit 1621 will next be described in detail. FIG. 18 is a block diagram illustrating an exemplary configuration of the material detection unit 1621. A feature extraction unit 1831 extracts a feature amount at a predetermined sampling point against input data. A model data storage unit 1832 stores in advance information about categories of a plurality of subjects to be extracted as model data. As described above, if the specific category is a person, model data about the face is stored in the model data storage unit 1832. The model data can be, for example, face image data, predetermined feature vector data about an entire face obtained by a main component analysis or an independent component analysis, or local feature data about a feature area on individual face such as eyes, mouth on a face. A matching processing unit 1833 performs a matching processing (similarity calculation) between the input image data and the model data based on the extracted feature amount.

As the processing performed in the matching processing unit 1833, for example, in a case where image data is processed, a method used in an image information extracting apparatus described in Japanese Patent Application Laid-Open No. 09-130714 can be used. In this image information extracting apparatus, a template model image of a size corresponding to a subject distance is generated, while using the image and scanning a screen. By calculating a normalization correlation function at each point, a similarity distribution between a local part of the input image and the model data is calculated. Further, an algorithm based on a spatial position relationship of a local feature described in Japanese Patent No. 3078166 or an algorism based on a folded-neural network circuit described in Japanese Patent Application Laid-Open No. 2002-8032 can be used. Generally, if a maximum value of the similarity distribution exceeds a predetermined threshold, a pattern which belongs to the category is considered to be detected. If the input data is audio, for example, a similar predetermined processing using a known algorism, for example, an algorithm using the Hidden Markov Model can be executed.

Further, to reduce a processing time of the material detection, as a pre-processing, an operation for narrowing down a search area can be performed in which a extraction of a primary feature amount (low-level feature amount such as movement vector, color information) out of time-series input image data is performed by using a known method. A candidate area having a higher possibility that a main subject exists therein, is extracted, and the narrowing down of search area can be performed. For example, based on color information, an image area having a color close to a color of a important part (for example, skin color of a person) of model image data which is registered in advance is extracted by a threshold processing, and the narrowing down operation can be performed. Further, a area having a movement vector amount greater than a predetermined size or a detection area similar to a head part of a person can be extracted as a subject candidate area. When using the movement vector, it is preferable that the image taking unit 1403 is fixed and placed at a predetermined position. In a case of hand-held image taking, a global movement vector amount (Ego-movement vector) generated in connection with a movement of the image taking unit 1403 is extracted. After the global movement vector amount is offset from an entire global movement vector distribution, an area split based on the global movement vector amount is performed. Thus, a candidate area of a moving member such as a person can be computed.

It is further noted that the processing performed in the matching processing unit 1833 according to this embodiment is not limited to the above-described processing method, and that known methods can be appropriately applied.

Next, the status detection unit 1622 (from FIG. 16) will be described. The status detection unit 1622 detects a status class about a specific category (face etc.) designated by the photographer or a mode of the camera device 1400 according to this embodiment. In the status class, a category designated by the photographer or a mode of the camera device 1400 according to this embodiment is a large classification, and status detection is performed by using a middle classification level, and a small classification level. The status category is, for example, in a case of a person such as this embodiment, a facial expression and an orientation of face, classified in advance depending on a material to be detected and stored in a predetermined memory.

Figure 19:
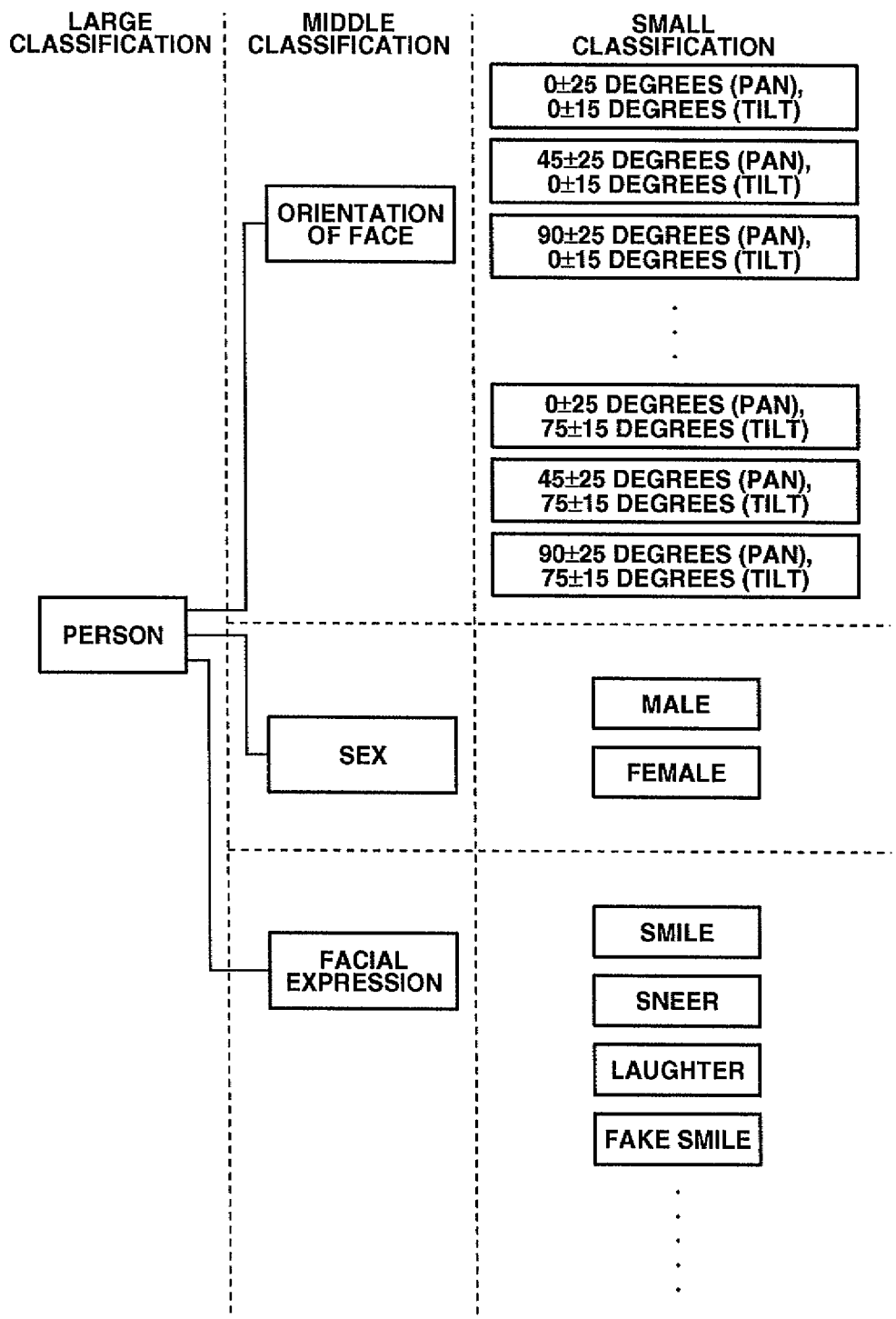
FIG. 19 illustrates an example of a status class stored in a status detection unit according to the thirteenth embodiment of the present invention.

In FIG. 19, an example of the status class classified in a tree structure per each class of a material to be stored in the memory is shown. As shown in FIG. 19, if the large classification is "person", and the middle classification is "orientation of face", as the small classification, classes segmented in a pan direction and a tilt direction are determined in advance. If a status class of a face is detected, first, detection of feature parts effective for the detection of a sex, a facial expression, and an orientation of face such as an outer corner of the eye, mouth area is performed. As a result, as the status class, a category such as "slanting, male, no expression" is detected.

Figure 20:
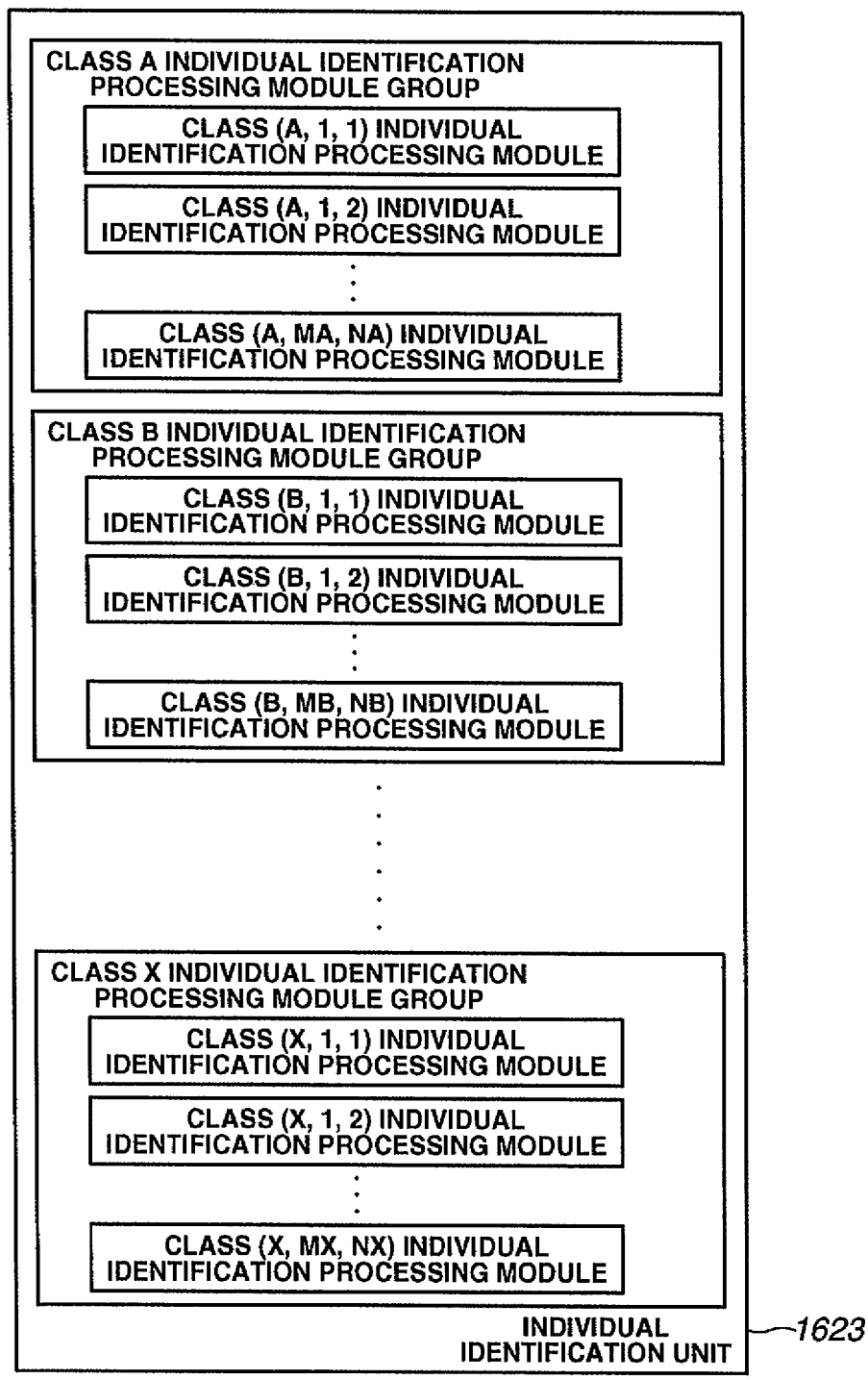
FIG. 20 illustrates an exemplary configuration of an individual recognition unit according to the thirteenth embodiment of the present invention.

Next, the individual recognition unit 1623 (from FIG. 19) will be described. The individual recognition unit 1623 performs an individual identification processing in the status class detected in the status detection unit 1622 among the area of face detected in the material detection unit 1621. FIG. 20 illustrates a configuration of the individual recognition unit 1623. In this case, the status class is classified in advance as a tree structure having a large classification, a middle classification, and a small classification, and a processing module group is arrayed for each large classification. For example, a large classification indicates "face", a middle classification indicates an orientation of face such as "front", and a small classification indicates a status such as "age". The classification style of the status class can be a style other than the tree structure. A control unit for selecting an individual identification processing module specialized in the status class detected by the status detection unit 1622, and the individual identification processing module groups are provided in the individual identification unit 1623. The control unit and the individual identification processing module groups can be stored in advance as a program in a predetermined memory or as a hard IP core stored in a system LSI in the subject candidate extraction unit 1409.

For example, if it is detected by the status detection unit 1622 that the state of a face belongs to the status class of "front, male", the individual identification unit 1623 selects an individual identification module corresponding to the status class. The individual identification module corresponding to each status class has a certain width of identification performance. That is, even if the individual identification module is specialized in "front, male", within an attribution range such as a certain orientation of face or relatively wide range of age (for example, male faces from teens to seventies), the individual identification module is generated by learning in advance so that robust identification against variation is possible.

As such identification module, for example, a support vector machine configured to identify faces of two specific persons in a specific status category is generated by learning and used. For the learning, for example, a face data set about two specific persons in a certain range around a specific status category (in this example, front, smile) is used to train the support vector machine to identify the two person. As an example of the range around a specific status category, face turning within the range of ±20 degrees from front, and faces of male of various ages are included. A support vector machine of a "one-against-all" type can be generated. In this case, the support vector machine can be generated to the number of individuals that should be identified.

In this case, as to the status class in the specific category, such support vector machines which perform an identification of binary are generated by learning up to the number of combinations of all pairs. When performing the identification process, it is not necessary to carry out the identification process as to the combinations of all pairs, but if a binary tree system is used, it is enough to carry out a comparison of the number of classes-1. This example is discussed in a document, Guo, Li, and Chan "Face Recognition by Support Vector Machines, in Proc. of 14th International Conf. on Automatic Face and Gesture Recognition, 2000. However, sometimes it is difficult to perform such generation of the identification module in advance as to all status classes of all pairs.

Accordingly, the generation of the identification module can be performed as a result of a detection of the status class, as to a person who could not be identified, after the identification and the result is to be accumulated. For example, if a detected specific status category cannot be identified (or, the reliability of the identification result is assumed to be low), the generation of identification module can be tried by a method of learning by using face image data of the same person in the status class.

As each module of the individual identification processing, other than the above method based on the support vector machine, a method using a hierarchical neural network or a method using a statistical pattern recognition can be used. For example, a method using a folded neural network as the hierarchical neural network can be used as a base (document: Lawrence et al., "Face Recognition: A Convolutional Neural-Network Approach, IEEE Transactions on Neural Networks, vol. 8, pp. 98-113, 1997). In this case, face image data for learning is provided for each status class, and the individual identification processing module can be generated by performing learning with a teacher. As described, it is possible to configure each module by using the various methods.

As described above, first, a status class (orientation of face, sex, and the like) is determined both at a time of identifying the face, and at learning, and based on the result, an identification module specialized in a specific status class is generated. Otherwise, an identification operation of an individual is performed by selectively starting a learned specific identification module (it is not always to be one identification module). As a method for the selective starting, based on the detected status class, a start-up of an individual identifying module corresponding to a class near the detected status class can be performed.

As described above, by performing the determination (relatively light processing) to which status class (sex, orientation of face, or the like) of types set in advance belongs before the individual identification, it is possible to effectively narrow down a search area for individual identification in a feature space. After the determination, by performing an identification operation by an identification module generated by being specified to the status class detected, it is possible to effectively and accurately identify as compared with the case where the individual identification is performed in a set which includes all status classes.

Next, the subject candidate proposition unit 1410 (from FIG. 14) will be described. The subject candidate proposition unit 1410 determines whether the subject candidate extracted by the subject candidate extraction unit 1409 is in the image display unit 1407 or out of the image display unit 1407 (step S7 in FIG. 15). If it is determined that the subject candidate is in the image display unit 1407, the subject candidate proposition unit 1410 proposes the subject candidate by highlighting by maker (step S8).

Figure 21:
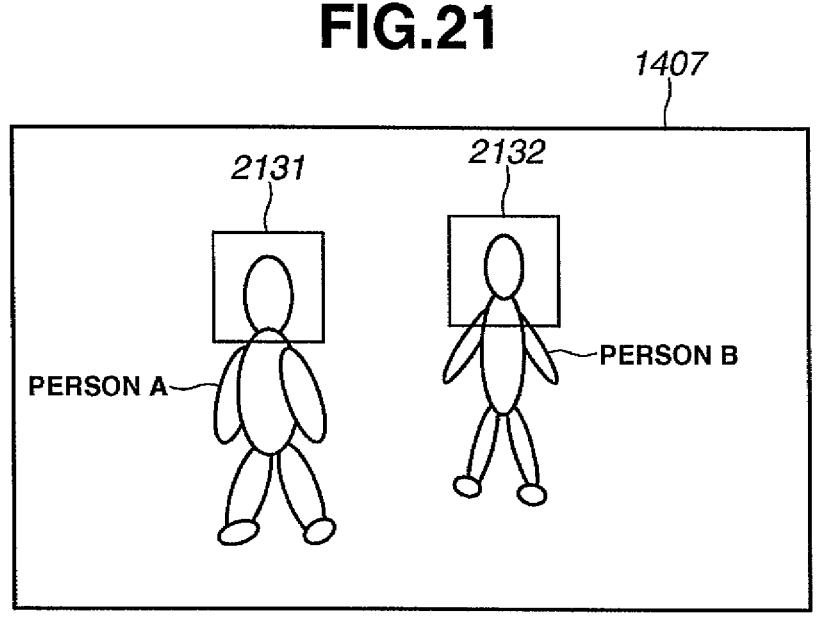
FIG. 21 illustrates an example of a display in a case where a subject candidate is in an image display unit according to the thirteenth embodiment of the present invention.

FIG. 21 illustrates an example in which information about face positions of persons who are subject candidates on the image display unit 1407 is presented by the subject candidate proposition unit 1410. In the example shown in FIG. 21, while in the faces of persons who are subject candidates, maker (frame) displays 2131 and 2132 are displayed, it is possible to display, for example, attributes (sex, age, expression, individual name) of the person. It is also possible to display these attributes not by character strings but by abstract attributes of icons and the like. If a plurality of subject candidates is detected by subject candidate extraction unit 1409, as shown in FIG. 21, it is possible to display them as they are by superposing them, or control them as described below. That is, if the level of importance of the subject candidates is determined by an instruction from the photographer and the photographing mode, or if the level of importance is calculated from a past history of the subject candidate extraction result, it is possible to selectively propose the subject candidate.

Figure 22:
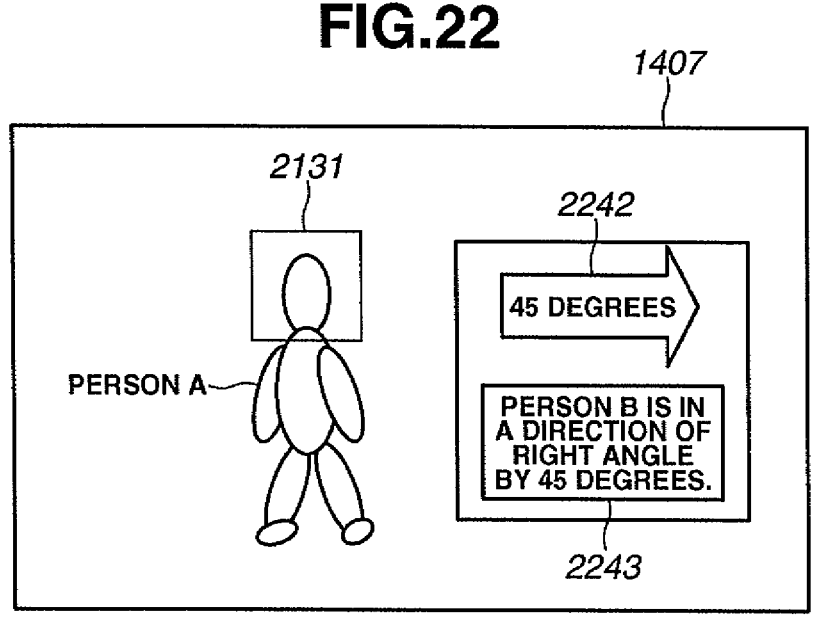
FIG. 22 illustrates an example of a display in a case where a subject candidate is outside of an image display unit according to the thirteenth embodiment of the present invention.

FIG. 22 illustrates a case in which among the plurality of subject candidates, if at least a part of them are outside of the image display unit 1407, the subject candidate proposition unit 1410 displays information display (step S1509 in FIG. 15). In this case, with respect to the subject candidate which is out of the image display unit 1407, an arrow indication 2242 indicates its general information about how far the subject candidate is away from the image display area and a message indication 2243 presents more detailed information. By using the information, it is possible to automatically change a pan angle or a tilt angle, or a image angle of the image forming optical system 1401 so that the image taking unit 1403 is able to take image of the subject candidate.

As described above, if the subject candidate is out of the image taking image angle, it is possible to detect the existence of the subject candidate. Further, it is possible to present the information about the position of the subject candidate which exists out of the image taking image angle.

In the above thirteenth embodiment, based on the image data from the image taking unit 1403 or the information form the wide range sensor 1408, the subject candidate is detected. However, if the information obtained from the wide range sensor 1408 includes the image taking area of the image taking unit 1403, it is possible to detect the subject candidate based on the information from the wide range sensor 1408 without using the image data from the image taking unit 1403.

Further, in the thirteenth embodiment, the wide range sensor 1408 outputs the image data. However, a category can be set depending on a subject to be detected, for example, for a temperature sensor, a category of temperature is set, and for an sound receiving device, a category of audio is set. Particularly, in a case of the temperature sensor, for example, a predetermined temperature range of 35 degrees to 37 degrees is set and in a case of the sound receiving device, for example, a category to be detected is set to "laughter" or "sound equal to or more than XX decibel and the like. Further, a determination whether the subject is in the image taking area of the image taking unit 1403 can be made based on a image angle of the image taking angle 1403.

Alternative Modification of the Thirteenth Embodiment

In a thirteenth embodiment, while the image taking unit 1403 and the wide range sensor 1408 are independently configured respectively, it is possible that the image taking unit 1403 and the wide range sensor 1408 are integrally configured. In this modification, this case will be described. The basic configuration and processing of a camera device are similar to those described in the above-described thirteenth embodiment, and therefore, only potions different from the thirteenth embodiment will be described.

Figure 23:
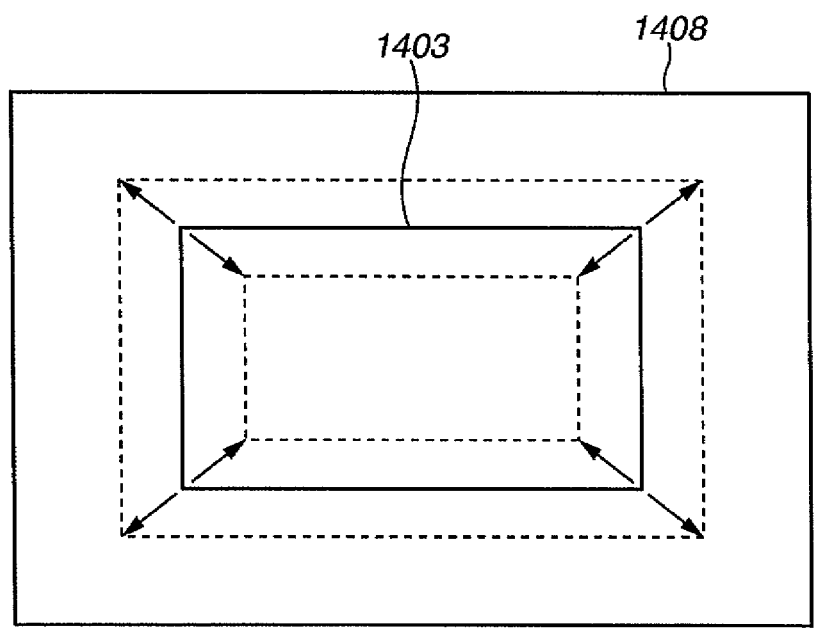
FIG. 23 illustrates a view for explaining an image taking unit having a function of a wide range sensor according to a modification of the thirteenth embodiment of the present invention.

FIG. 23 illustrates a relationship between the image taking unit 1403 and the wide range sensor 1408 which are integrally configured by an area sensor which includes a sensing area of the wide range sensor 1408. Accordingly, image data output from a part of the area sensor corresponds to the image data output from the image taking unit 1403. The image data output from the area of the whole of the sensor or the area other than the area corresponding to the image taking unit 1403, corresponds to the image data output from the wide range sensor 1408.

A size of the image taking unit 1403 is varied in response to a image angle instruction from the photographer. If an instruction is given to narrow the image angle (zoom in), for example, image data in an area indicated by dotted lines that is narrower than the area indicated by solid lines in FIG. 23 is output as image data of the image taking unit 1403. On the other hand, if an instruction is given to widen the image angle (zoom out), for example, image data in an area indicated by dotted lines that is wider than the area indicated by solid lines in FIG. 23 is output as image data of the image taking unit 1403. In consideration of resolutions, the area of the image taking unit 1403 is adjusted so that the area is within an area of a fixed rate against the wide range sensor 1408 by adjusting an image angle of the image forming optical system 1.

Hereinafter, an area around the center of the area sensor is referred to as the image taking unit 1403, and, the whole area or an area other than the area corresponding to the image taking unit 1403 is referred to as the wide range sensor 1408. Image data output from the image taking unit 1403 is to be an image displayed on the image display unit image display unit 1407.

Figure 24:
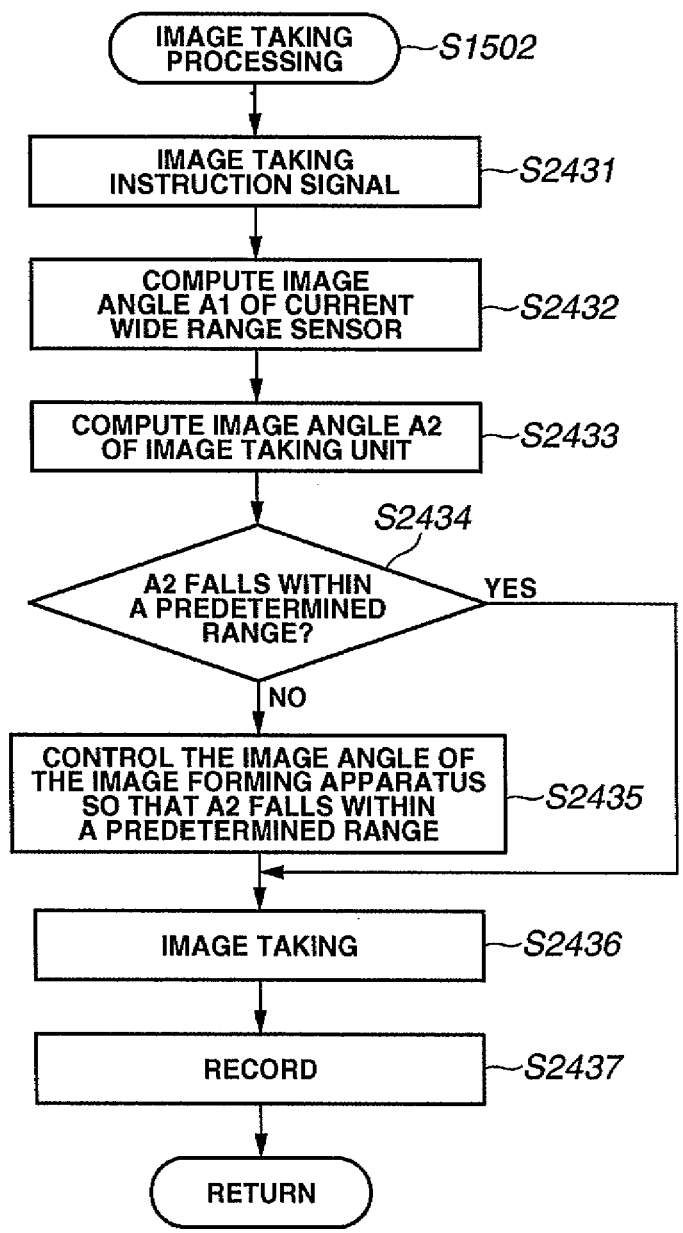
FIG. 24 is a flow chart of exemplary image taking processing according to a modification of the thirteenth embodiment of the present invention.

With reference to FIG. 24, an exemplary image taking processing performed at step S1502 in FIG. 15 will now be described if the image taking unit 1403 and the wide range sensor 1408 are the same device. If an image taking instruction signal is generated by a depression of a shutter (not shown) by a photographer step S2431), a current image angle A1 is computed based on camera parameters in the image forming optical system 1401 (step S2432). This current image angle A1 corresponds to the angle of the wide range sensor 1408. Then, an image angle A2 of the image taking unit 1403 is computed based on camera parameters designated by the photographer (step S2433). Then, it is determined whether the computed image angle A2 is in a predetermined range against the current image angle A1 (step S2434). If it is determined that the image angle A2 is not in the predetermined range, an image angle of the image forming optical system 1401 is adjusted by the image forming optical system control unit 1402 so that the image angle A2 falls within the predetermined range (step S2435). Then, an actual image taking instruction signal is sent to the image taking unit 1403, and image taking is performed (step S2436). If the image angle A2 falls within the predetermined range against the image angle A1 (YES at step S2434), the process moves to step A2436 and an image taking is performed. Then the image data obtained by the image taking is temporarily stored in the image storage unit 1406 (S2437).

Figure 25:
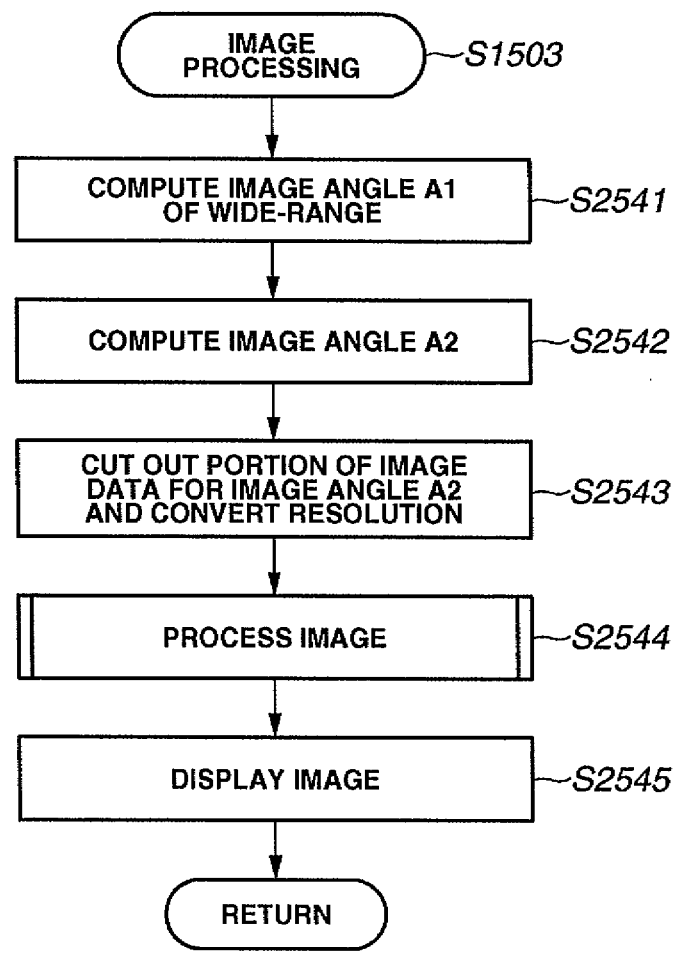
FIG. 25 is a flow chart of exemplary image processing according to a modification of the thirteenth embodiment of the present invention.

With reference to FIG. 25, exemplary image processing performed at step S1503 in FIG. 15 according to this modification will be briefly described. An image angle A1 of the image forming optical system 1401 is computed based on camera parameters obtained from the image forming optical system control unit 1402 (step S2541). As described above, this image angle A1 corresponds to the angle of the wide range sensor 1408. Then, an image angle A2 designated by the photographer is computed (step S2542).

Then, based on the image angles A1 and A2, an image is cut out to be the image of the image angle A2 out of the image data obtained from the area sensor, and a resolution conversion is performed (step S2543). After a predetermined image processing such as an aberration correction for correcting a distortion in the image forming optical system 1401, or a processing of converting brightness, is performed (step S2544), the image is displayed on the image display unit 1407 (step S2545). The predetermined image processing is, for example, an aberration correction for correcting a distortion in the image forming optical system 1401, or a processing of converting brightness. Further, a resolution of the image data is converted to be suitable for the resolution of the image display unit 1407. The predetermined image processing may not be partially or completely performed if a processing speed is important, for example.

As described above, according to this modification, the image taking unit 1403 and the wide range sensor 1408 can be realized as the same configuration. In that case, as compared to the case in which the image taking unit 1403 and the wide range sensor 1408 are configured separately, the configuration can be simplified.

Fourteenth Exemplary Embodiment

In the fourteenth embodiment, in addition to the configuration in the thirteenth embodiment, further an exemplary moving member anticipation unit 2611 (see FIG. 26) is included, which will be described.

Figure 26:
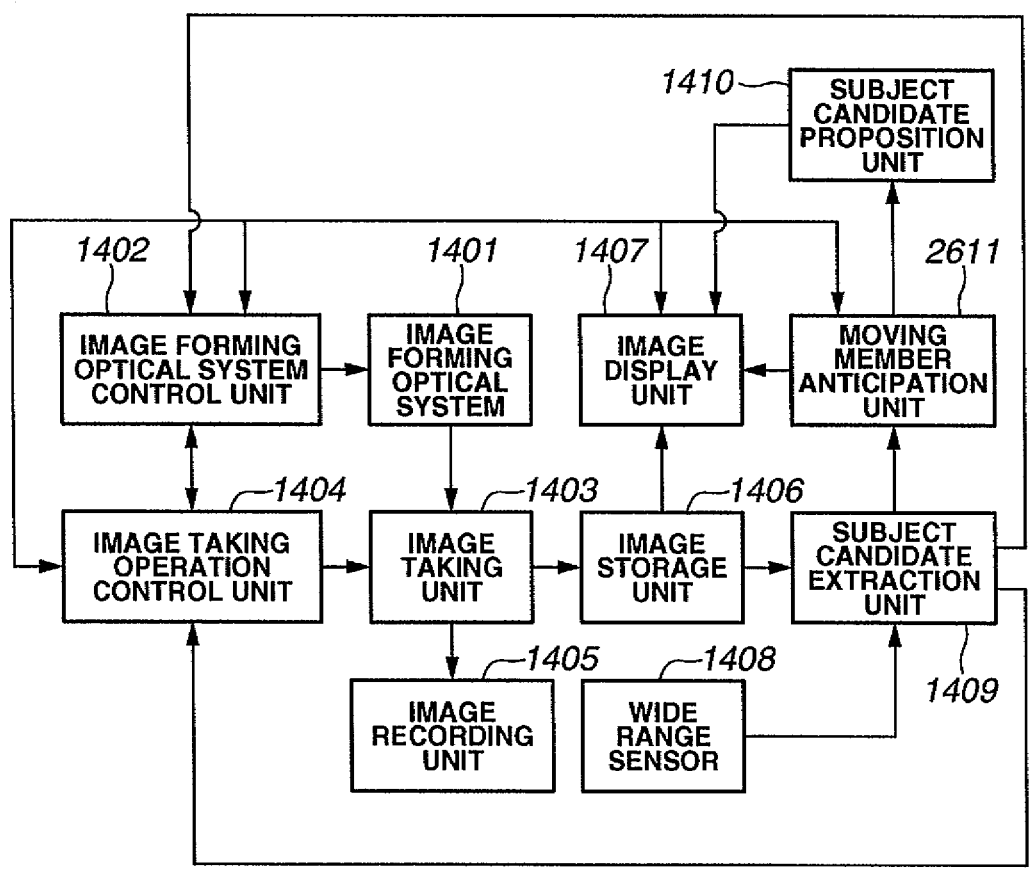
FIG. 26 is a block diagram that illustrates an exemplary functional configuration of a camera device according to a fourteenth embodiment of the present invention.

FIG. 26 is a block diagram illustrating an exemplary functional configuration of a camera device 2600 according to the fourteenth embodiment of the present invention. The configuration shown in FIG. 26 is further provided with a moving member anticipation unit 2611 in addition to the configuration of FIG. 13, as compared to the configuration of FIG. 14 described in the thirteenth embodiment. The moving member anticipation unit 2611 anticipates time that a subject candidate which is out of an image taking image angle enters in the image taking image angle, and time that a subject candidate which is in an image taking image angle moves out of the image taking image angle. The subject candidate proposition unit 1410 presents the anticipation to the photographer as information. Other constituent elements are similar to those in FIG. 14, and therefore, the same reference numerals are numbered and their description is omitted.

The subject candidate extraction unit 1409, as well as the subject candidate extraction unit 1409 in the thirteenth embodiment, has the material detection unit 1621 which detects multi-category such as each part of body of a person, a vehicle, or limited categories registered in advance. Further, in the fourteenth embodiment, if the material detected object is a person, the status detection unit 1622 which detects attribution information such as an age or a sex has a function of detecting a moving state. As a check class model data for determining whether the subject is moving, data which is time-series data of material detection result, and variation pattern of a feature point position of each part of a moving member are used. The feature point position of each part of a moving member is in a four-dimensional space in which a time axis is added to a three-dimensional space, or a three-dimensional space in which a time axis is added to a two-dimensional space projected to an image taking sensor plane.

Figure 27:
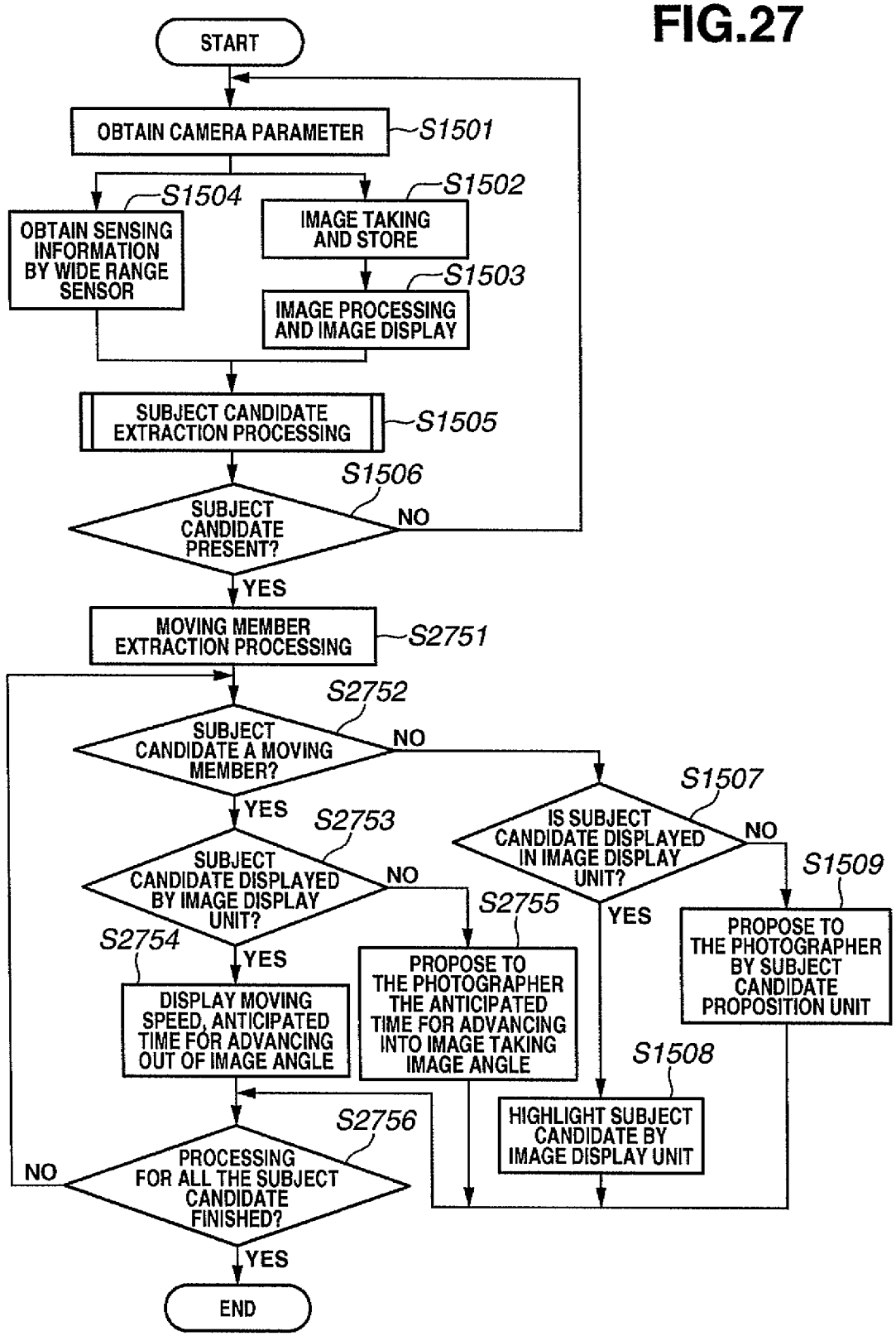
FIG. 27 is a flow chart of exemplary subject candidate detection processing according to the fourteenth embodiment of the present invention.

FIG. 27 is a flowchart illustrating an exemplary processing for presenting a subject candidate according to the fourteenth embodiment of the present invention. The processing shown in FIG. 27 is similar to those in FIG. 15 which is described in the thirteenth embodiment until the processing at step S1506 that determines whether a subject candidate exists. Therefore, their descriptions are omitted and processing performed after a determination that the subject candidate exists will be described.

At step S1506, if it is determined that a subject candidate exists, the process moves to step S2751 and a moving member extraction processing is performed. As described above, the processing is performed by labeling in advance a subject candidate and a material in moving state according to a result of a status detection processing (step S1722 in FIG. 17), and checking the label. The moving member extraction processing will be described in detail below. Then, it is determined whether the subject candidate is a moving member (step S2752). If it is determined that the subject candidate is not a moving member, processing similar to that in steps S1507 through S1509 in FIG. 15 is performed and the process moves to step S2756.

On the other hand, if the subject candidate is a moving member (YES at step S2752), it is determined whether the subject candidate is displayed on the image display unit 1407, that is, the subject candidate is included in images taken by the image taking unit 1403 or not (step S2753). If the subject candidate is displayed on the image display unit 1407, the subject candidate proposition unit 1410 performs a marker indication to the subject candidate, and further, presents the photographer information obtained by the moving member anticipation unit 2611 by outputting a message on the image display unit 1407 or by outputting sound from a speaker (step S2754). The information obtained by the moving member anticipation unit 2611 is, for example, a moving speed, time moving from the interior of a display screen to the outside, or, a moving speed of a camera device, an exposure, a focus control to be most suitable instruction information to perform so-called panning photography which performs image taking of a moving member without blurring.

On the other hand, if the subject candidate is not displayed on the image display unit 1407, that is, in a case where subject candidate information is extracted from only information output from the wide range sensor 1408 (NO at step S2753), information obtained by the moving member anticipation unit 2611 is displayed on the image display unit 1407. In this case, for example, other than a category or an attribution of a subject, information about anticipated time the subject candidate enters an image taking image angle, or an instruction, shutter timing, a focus, an exposure most suitable for performing above-described panning photography is presented.

Processing after step S2752 is performed to all subject candidates (until it becomes YES at step S2756), and the processing is completed.

Figure 28:
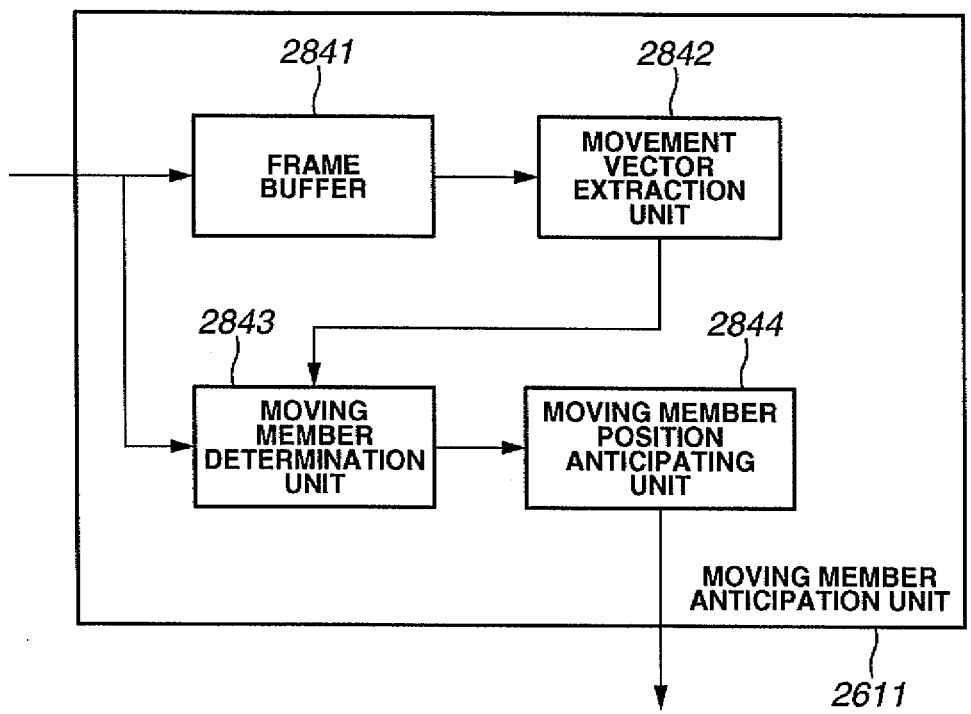
FIG. 28 is a block diagram that illustrates an exemplary configuration of a moving member anticipation unit according to the fourteenth embodiment of the present invention.

With reference to FIG. 28, the moving member anticipation unit 2611 will be described. FIG. 28 is a block diagram illustrating an exemplary configuration of the moving member anticipation unit 2611. In order to extract a movement vector, a frame buffer 2841, temporarily stores the image data stored in the image storage unit 1406, information obtained from the wide range sensor 1408, and a result of the subject candidate extraction unit 1409. A movement vector extraction unit 2842 obtains a movement vector of a subject candidate which is a moving member by using image data obtained from the frame buffer 2841, the information obtained from the wide range sensor 1408, and the time-series data which is the result of the subject candidate extraction unit 1409. A moving member determination unit 2843 computes a speed of a moving member extracted in movement vector extraction unit 2842 and outputs the speed as time-series data. A moving member position anticipating unit 2844 anticipates a position of a moving member from the time-series data of speed of the moving member obtained from the moving member determination unit 2843, and computes a time when the subject candidate comes to a boundary of an image angle of the image taking unit 1403.

Figure 29:
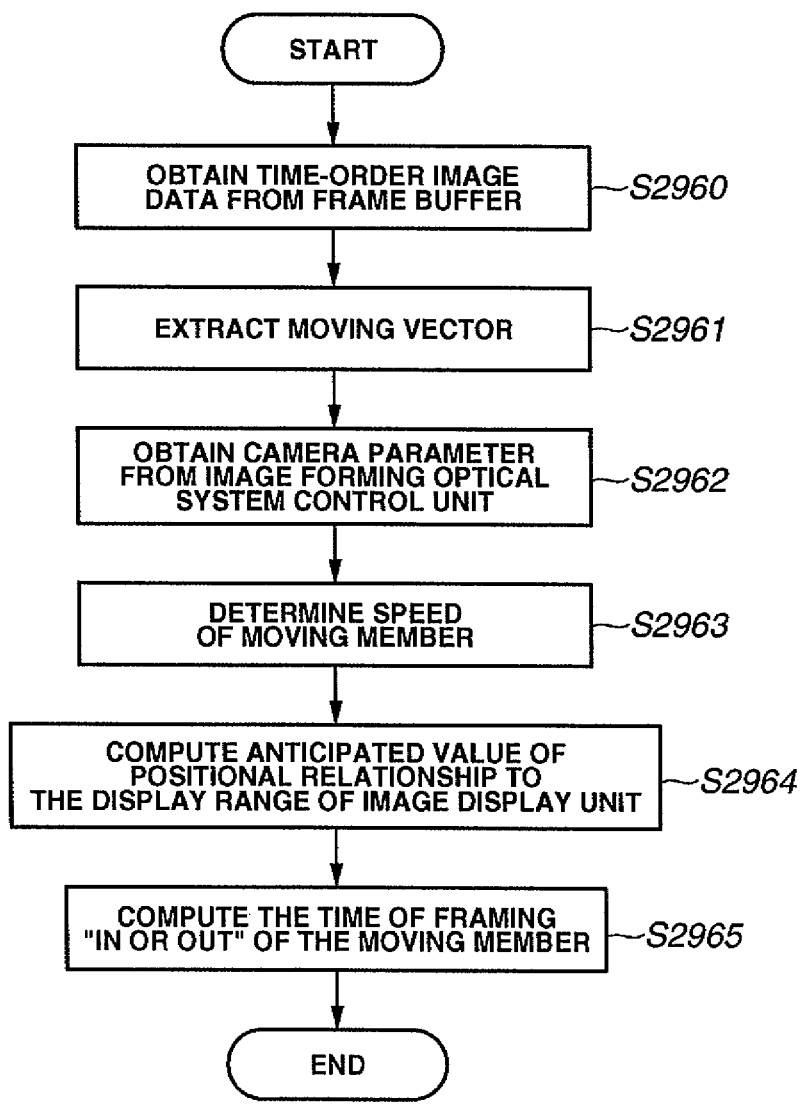
FIG. 29 is a flow chart of an exemplary moving member anticipation processing according to the fourteenth embodiment of the present invention.

With reference to a flowchart in FIG. 29, the processing in the moving member anticipation unit 2611 will be described. The processing is performed at step S2754 and step S2755. First, time-series data of an image is obtained from the frame buffer 2841 (step S2960). Then, a movement vector is extracted from the time-series image data (step S2961). In this case, the moving vector can be obtained by using known techniques, for example, an optical flow. Even if the camera device 2600 is moving, by removing a global movement vector, only a movement vector of a moving member to which an attention is given, can be extracted. Then, a camera parameter is obtained from the image forming optical system control unit 1402 (step S2962). Since a focal length of the image forming optical system 1401 is obtained from the camera parameter and the size of the moving member is known in advance by the subject candidate extraction unit 1409, a distance to the moving member is computed and a moving speed of the moving member is anticipated from both elements, and a distribution of the movement vector (step S2963). Then, from the anticipated moving speed, a positional relationship between the image display unit 1407 and the display area is obtained in time-series (step S2964). At the same time, a speed of the camera device 2600 moving with the moving member which is most suitable for so-called panning photography, can be obtained from the camera parameter. In this case, an image taking is performed by focusing only a moving member. Time the moving member arrives to the boundary between the image display unit 1407 is presented as an anticipated time of framing in or framing out (step S2965).

Figure 30:
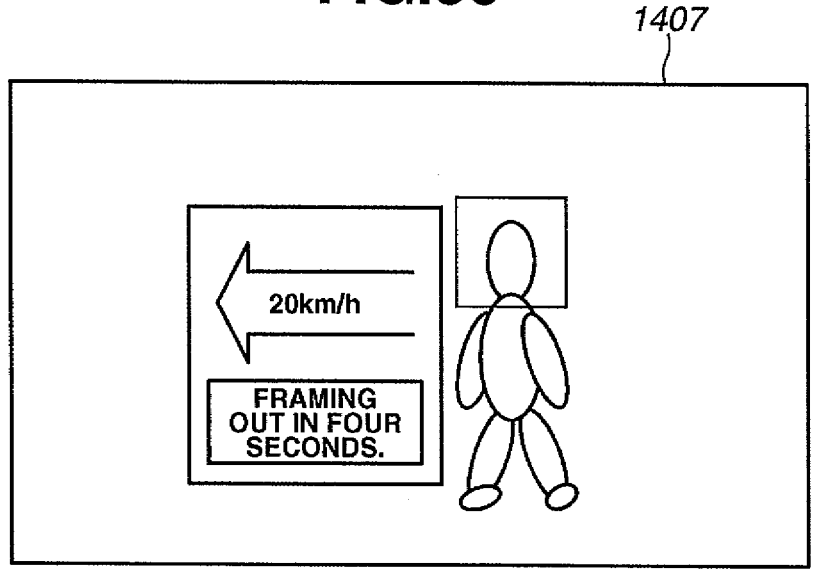
FIG. 30 illustrates an example of a display of an anticipated result in the moving member anticipation unit in a case where a subject candidate is in an image display unit according to the fourteenth embodiment of the present invention.

FIG. 30 illustrates an example of a display of a result (YES at step 2754) by the moving member anticipation unit 2611 in a case where a subject candidate is a moving member (YES at step S2752) and the subject candidate is in a display area of the image display unit 1407 (YES at step S2753). In this case, the moving member is a person, and the person is moving from the right side to the left side in the screen. By the subject candidate proposition unit 1410, a marker (frame) is displayed on the face of the person where a direction of movement is indicated together with an arrow in a moving direction. Further, an anticipated time when the person is framed-out is displayed as a message.

Figure 31:
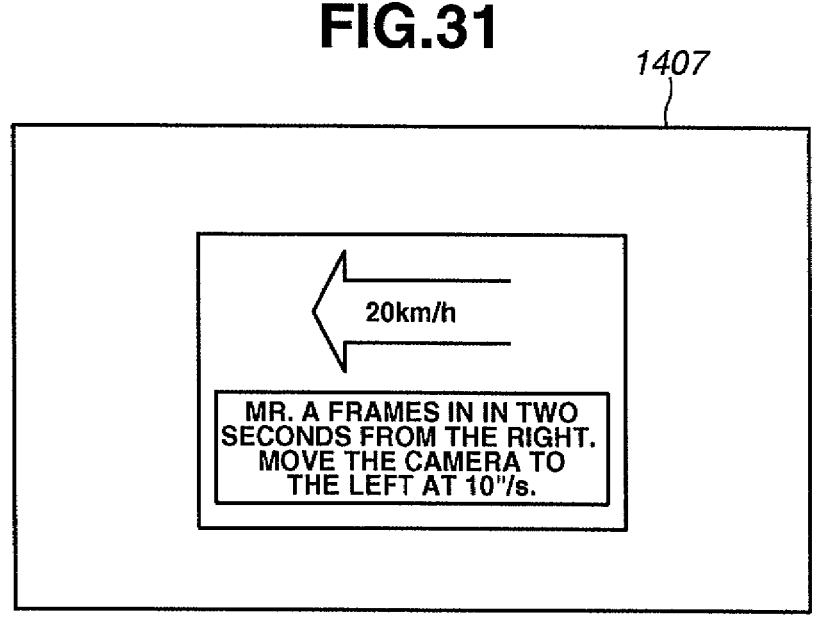
FIG. 31 illustrates an example of a display of an anticipated result in the moving member anticipation unit in a case where a subject candidate is out of an image display unit according to the fourteenth embodiment of the present invention.

FIG. 31 illustrates an example of a display of a result (YES at step 2755) by the moving member anticipation unit 2611 in a case where a subject candidate is a moving member (YES at step S2752) and the subject candidate is out of a display area of the image display unit 1407 (NO at step S2753). In this case, the moving member is a specific person A, and a case is assumed in which the person enters into the screen from the right outside of the display screen. A moving speed is presented with an arrow directing a direction of movement, and the name of the person and time of frame-in is displayed as a message. Further, a moving speed of the camera device most suitable for panning photography is displayed.

As described above, according to the fourteenth embodiment of the present invention, in addition to effects similar to the above thirteenth embodiment, if the subject candidate is a moving member, further detailed information can be proposed.

In the first embodiment and the fourteenth embodiment, the marker indication which indicates a subject candidate extracted by the subject candidate extraction unit 1409 is performed on the image display unit 1407. However, in the present invention, it is not always necessary to perform the marker indication. By using the extracted result of the subject candidate which is out of the image taking area of the image taking unit 1403, various controls can be performed, for example, based on the extracted information of the subject candidate, a camera device is controlled so that the subject candidate is taken by the image taking unit 1403.

Other Exemplary Embodiments, Features and Aspects of the Present Invention

The present invention can also be achieved by providing the system or the device with a storage medium which records a program code of software implementing the function of the embodiment and by reading and executing the program code stored in the storage medium with a computer of the system or the device (the CPU or the MPU).

In this case, the program code itself, which is read from the storage medium, implements the function of the embodiment mentioned above, and accordingly, the storage medium storing the program code constitutes the present invention.

As the storage medium for supplying such program code, a flexible disk, a hard disk, an optical disk, a magneto-optical disk, a CD-ROM, a CD-R, a magnetic tape, a nonvolatile memory card, a ROM, and the like can be used.

In addition, the function according to the embodiments described above is implemented not only by executing the program code read by the computer, but also implemented by the processing in which an OS (operating system) or the like carries out a part of or the whole of the actual processing on the basis of the instruction given by the program code.

Further, in another aspect of the embodiment of the present invention, after the program code read from the storage medium is written in a function enhancing board inserted in the computer or a memory which is provided in a function enhancing unit connected to the computer, the CPU and the like provided in the function enhancing board or the function enhancing unit carries out a part of or the whole of the processing to implement the function of the embodiment as described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed:

1. A network camera system which displays on a terminal device a partial image cut off from a picked up image picked up by an image pickup apparatus, the system comprising:
   a processor and a memory;
   an image pickup unit configured to pick up an image;
   a detection sensor configured to detect a change in a second area of the picked up image;
   a display unit;
   a display control unit configured to control to display on the display unit a first partial image of a first area cut off from the picked up image; and a changing unit configured to change a cut-off area in the picked up image from the first area to the second area such that a second partial image of the second area is displayed, wherein the display control unit further controls to display a superimposed image superimposed within the first partial image, the superimposed image indicating that the change in the second area is detected by the detection sensor, and a direction of the superimposed image with respect to the center of the first partial image being a same direction as a direction of the second area with respect to the first area, wherein the superimposed image contains only image data of the second area.

2. The system according to claim 1, wherein the display control unit controls to display the first partial image in a first size and changes to display the second partial image in the first size, wherein the second partial image in a second size smaller than the first size is overlapped on the first partial image when the first partial image is displayed in the first size.

3. A display control apparatus which controls display of a partial image cut off from a picked up image, the apparatus comprising:

a processor and a memory;

a display control unit configured to control to display a first partial image of a first area cut off from the picked up image;

a detection unit configured to detect a change in a second area of the picked up image outside of the first area;

a changing unit configured to change a size of a second partial image from a first size to a second size larger than the first size, wherein the second partial image in the first size overlaps on the first partial image in the second size, wherein the display control unit further controls to display a superimposed image superimposed within the first partial image, the superimposed image indicating that the change in the second area is detected by the detection unit, and a direction of the superimposed image with respect to the center of the first partial image being a same direction as a direction of the second area with respect to the first area, wherein the superimposed image contains only image data of the second area.

4. The apparatus according to claim 3, wherein the display control unit controls to display the first partial image in the second size and changes to display the second partial image in the second size, wherein the second partial image in the first size smaller than the second size is overlapped on the first partial image when the first partial image is displayed in the second size.

5. A method for controlling a display control apparatus configured to control display of a partial image cut off from a picked up image, the display control apparatus including a processor and a memory that executes the following method steps comprising:

a display controlling step of controlling to display a first partial image of a first area cut off from the picked up image;

a detection step of detecting a change in a second area of the picked up image outside of the first area; and a changing step of changing a size of a second partial image from a first size to a second size larger than the first size, wherein the second partial image in the first size overlaps on the first partial image in the second size, wherein the display controlling step further includes controlling to display a superimposed image superimposed within the first partial image, the superimposed image indicating that the change in the second area is detected by the detection step, and a direction of the superimposed image with respect to the center of the first partial image being a same direction as a direction of the second area with respect to the first area, wherein the superimposed image contains only image data of the second area.

6. The method according to claim 5, wherein the display controlling step further controls to display the first partial image in the second size and changes to display the second partial image in the second size, wherein the second partial image in the first size smaller than the second size is overlapped on the first partial image when the first partial image is displayed in the second size.

7. A non-transitory computer-readable storage medium for storing a computer program, computer-executable instructions stored thereon for executing the program, the medium comprising:

computer-executable instructions that execute a display controlling step of controlling to display a first partial image;

computer-executable instructions that execute a detection step of detecting a change in a second area of the picked up image outside of a first area;

computer-executable instructions that execute a changing step of changing a size of a second partial image from a first size to a second size larger than the first size, wherein the second partial image in the first size overlaps on the first partial image in the second size, wherein the display controlling step further includes controlling to display a superimposed image superimposed within the first partial image, the superimposed image indicating that the change in the second area is detected by the detection step, and a direction of the superimposed image with respect to the center of the first partial image being a same direction as a direction of the second area with respect to the first area, wherein the superimposed image contains only image data of the second area.

* * * * *